(12) United States Patent
Lee et al.

(10) Patent No.: US 12,025,808 B2
(45) Date of Patent: Jul. 2, 2024

(54) ELECTRONIC DEVICE

(71) Applicant: LG ELECTRONICS INC., Seoul (KR)

(72) Inventors: Dongyoung Lee, Seoul (KR); Sungchul Shin, Seoul (KR); Seungyong Shin, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 641 days.

(21) Appl. No.: 16/847,592

(22) Filed: Apr. 13, 2020

(65) Prior Publication Data
US 2021/0063754 A1  Mar. 4, 2021

(30) Foreign Application Priority Data

Aug. 28, 2019  (KR) .................. 10-2019-0105580

(51) Int. Cl.
*G02B 27/01* (2006.01)
*G06F 1/16* (2006.01)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC ... G02B 27/01–0189; G02B 2027/0105–0198; G06F 1/163
See application file for complete search history.

(56) References Cited

U.S. PATENT DOCUMENTS

| 2013/0127980 A1* | 5/2013 | Haddick | G06F 3/013 |
| | | | 348/14.08 |
| 2014/0022362 A1* | 1/2014 | Oellers | H04N 13/366 |
| | | | 348/60 |

(Continued)

FOREIGN PATENT DOCUMENTS

| KR | 1020090076539 | 7/2009 |
| KR | 1020180028339 | 3/2018 |

(Continued)

OTHER PUBLICATIONS

PCT International Application No. PCT/KR2019/012428, International Search Report dated May 26, 2020, 3 pages.

*Primary Examiner* — Bao-Luan Q Le
*Assistant Examiner* — Christopher A Lamb, II
(74) *Attorney, Agent, or Firm* — LEE, HONG, DEGERMAN, KANG & WAIMEY

(57) ABSTRACT

Disclosed is an electronic device. The electronic device according to the present disclosure comprises a display provided at a position corresponding to at least one of the left and right eyes of a user, the display including a lens and an optical element provided in the lens to transfer an image toward an eyeball of a user, and an image transfer for transferring an image provided from a processor to the optical element, wherein the image transfer is capable of varying the position of the optical element to which the image is transferred based on pupil position of the user. The electronic device according to the present disclosure is associated with an artificial intelligence (AI) module, an augmented reality (AR) device, a virtual reality (VR) device, a device related to 5G services and the like.

17 Claims, 26 Drawing Sheets

(52) U.S. Cl.
    CPC ...... *G06F 1/163* (2013.01); *G02B 2027/0132* (2013.01); *G02B 2027/0159* (2013.01); *G02B 2027/0178* (2013.01); *G02B 2027/0181* (2013.01); *G02B 2027/0187* (2013.01)

(56) References Cited

U.S. PATENT DOCUMENTS

| | | | | |
|---|---|---|---|---|
| 2014/0327601 | A1* | 11/2014 | Tilleman | G02B 27/0172 |
| | | | | 345/7 |
| 2015/0378164 | A1* | 12/2015 | Bailey | G02B 27/017 |
| | | | | 359/633 |
| 2017/0102548 | A1 | 4/2017 | Tremblay et al. | |
| 2020/0183169 | A1* | 6/2020 | Peng | G02B 6/0055 |
| 2021/0373333 | A1* | 12/2021 | Moon | G02B 27/0093 |

FOREIGN PATENT DOCUMENTS

| | | |
|---|---|---|
| KR | 1020180094013 | 8/2018 |
| KR | 1020190094306 | 8/2019 |
| KR | 1020190106878 | 9/2019 |

* cited by examiner

[Figure 1]
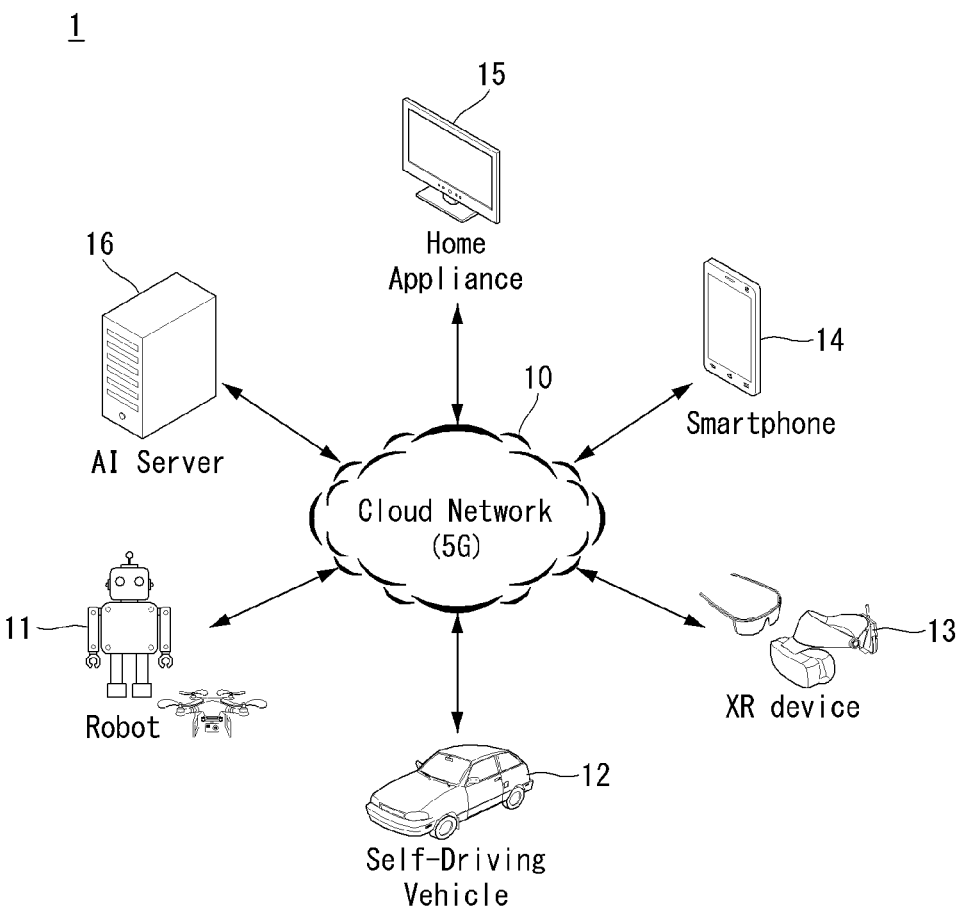

[Figure 2]
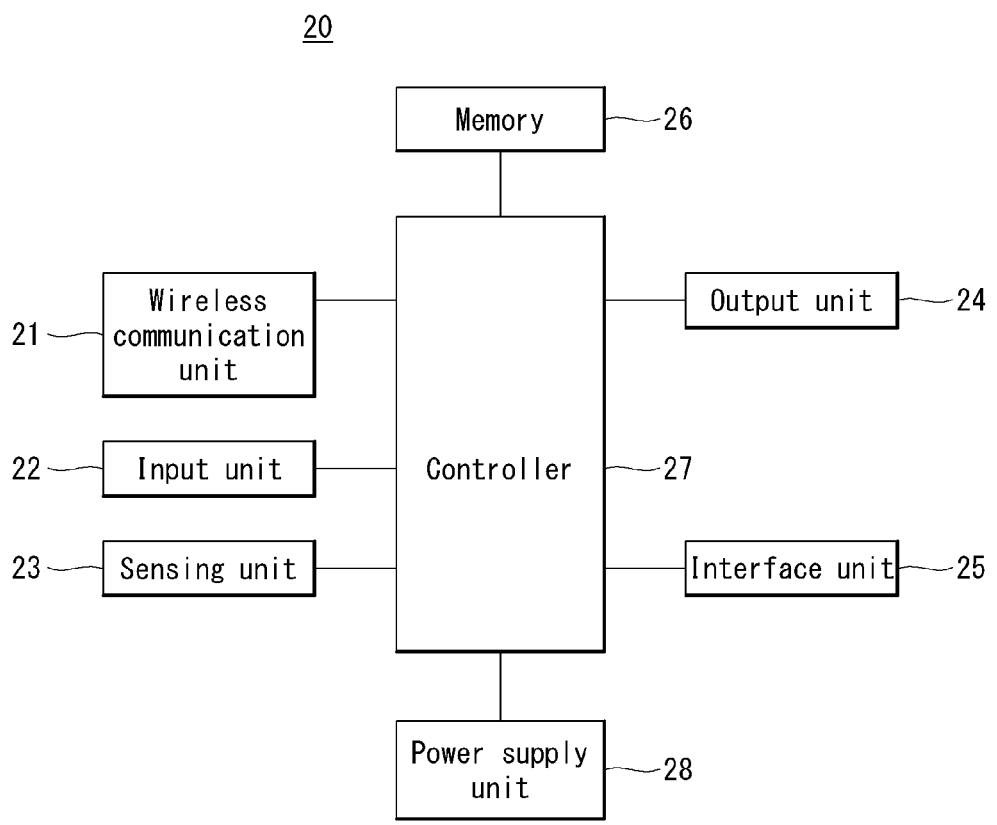

【Figure 3】
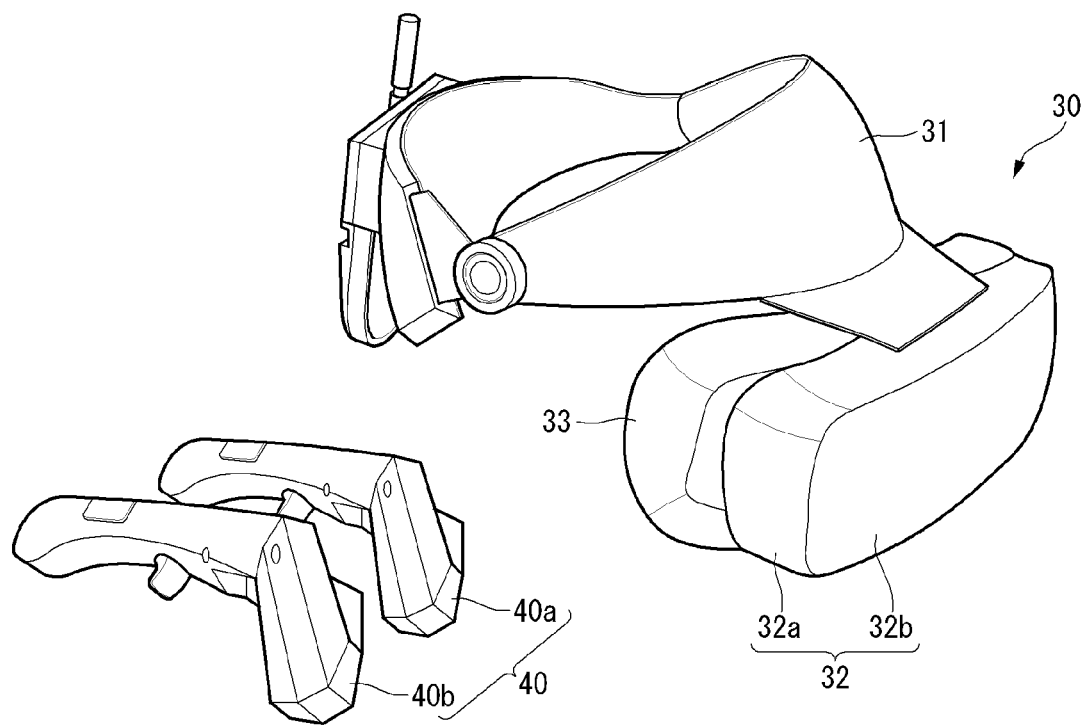

【Figure 4】
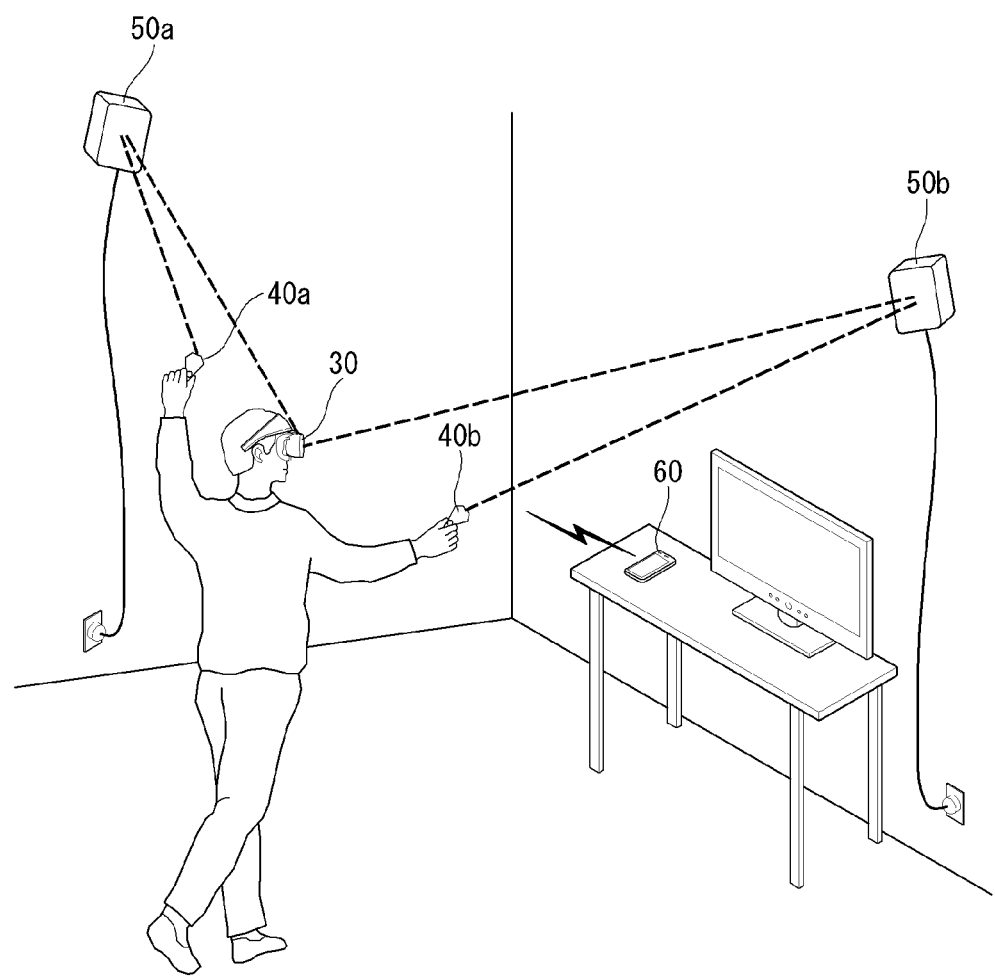

【Figure 5】
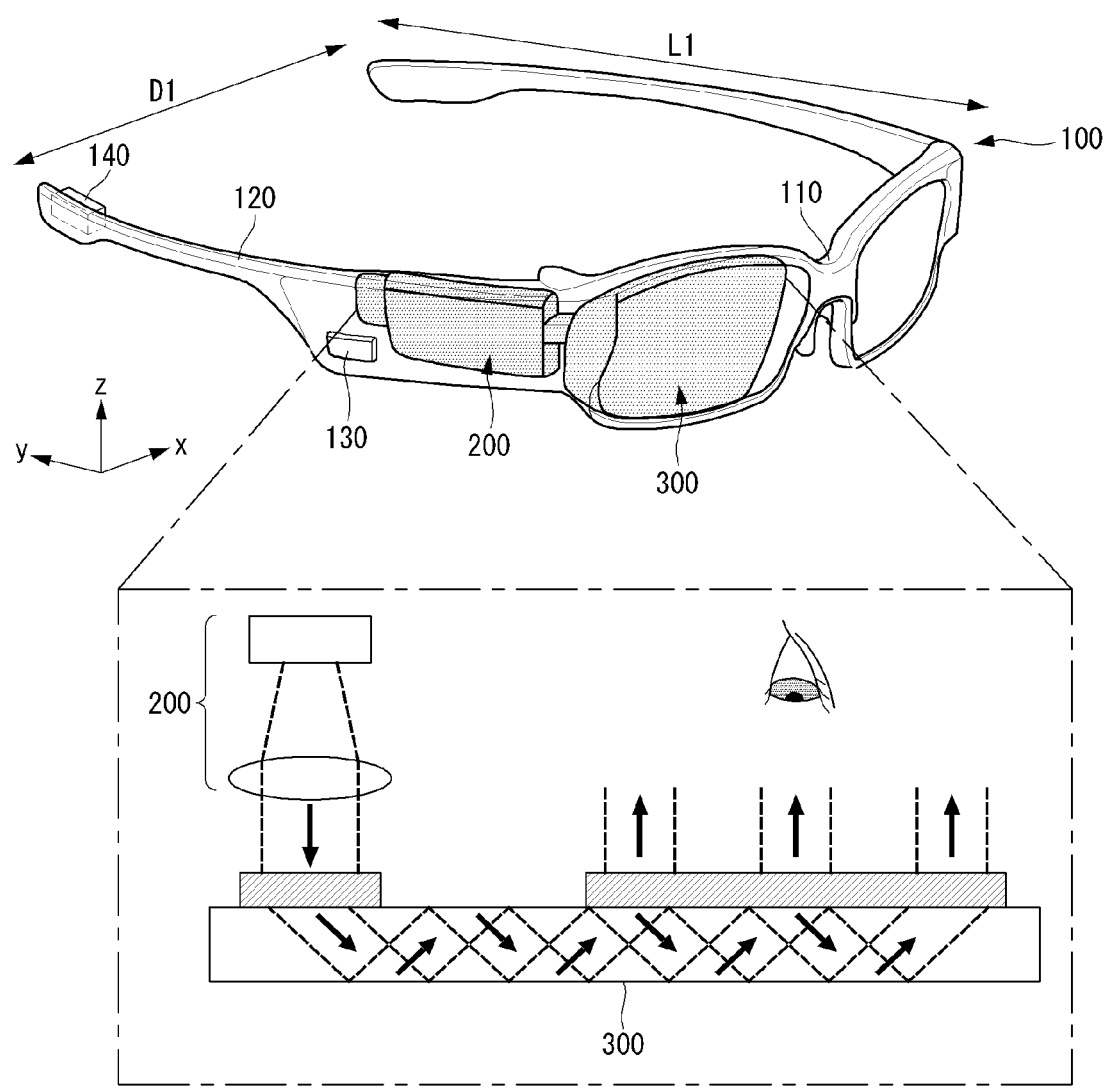

[Figure 6]
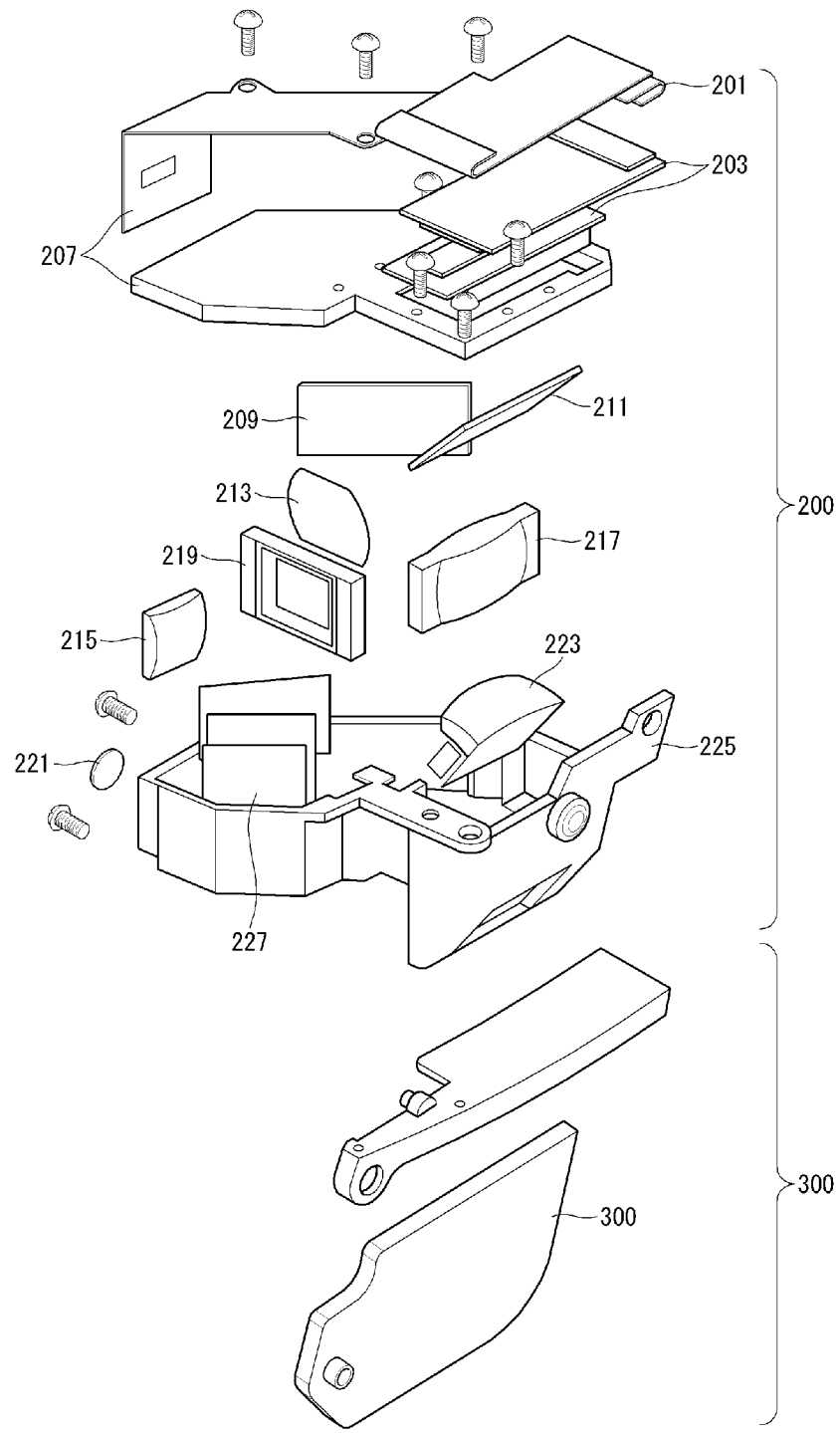

[Figure 7]
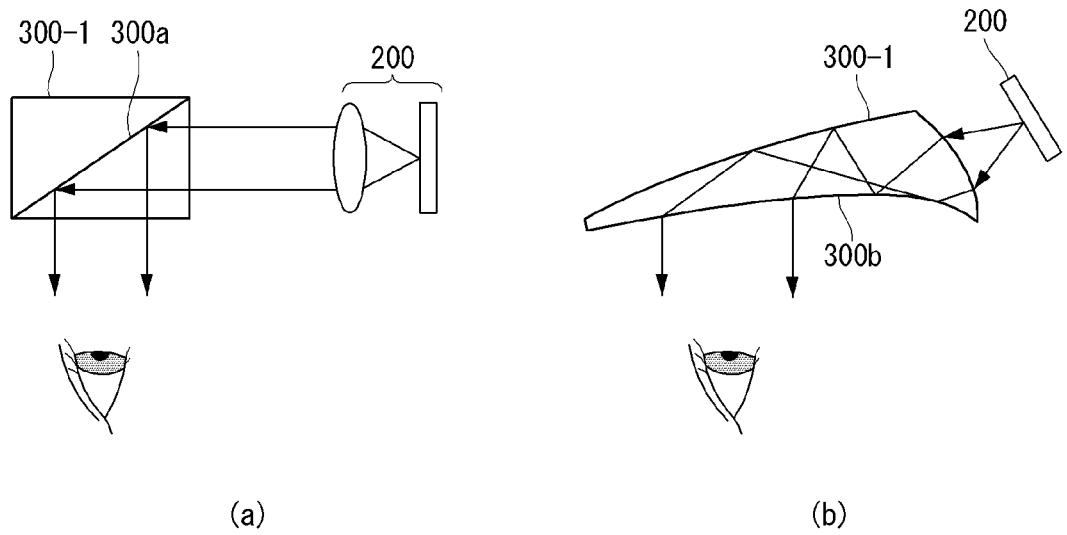
(a)            (b)

【Figure 8】
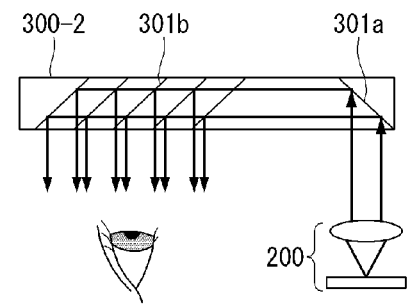
(a)
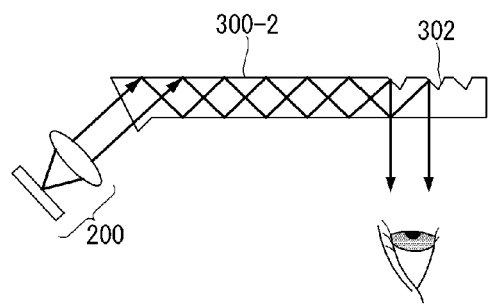
(b)
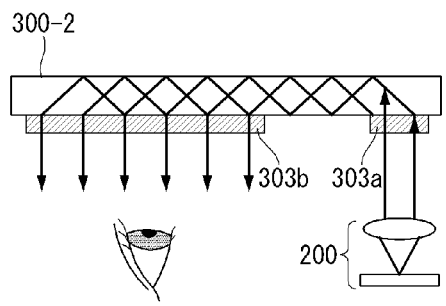
(c)
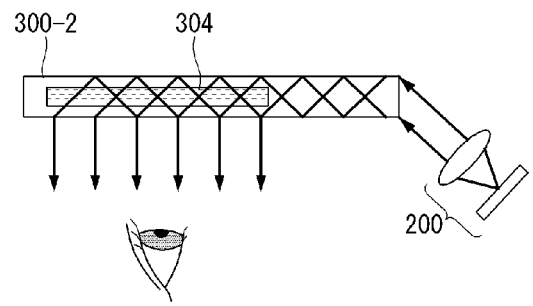
(d)
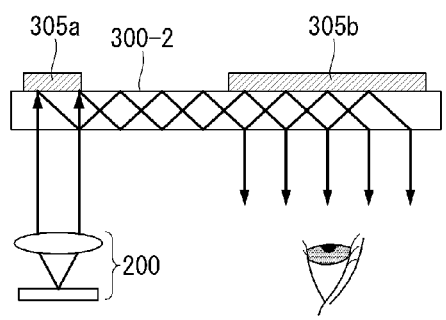
(e)
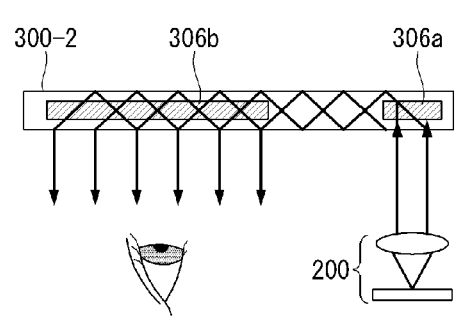
(f)

[Figure 9]
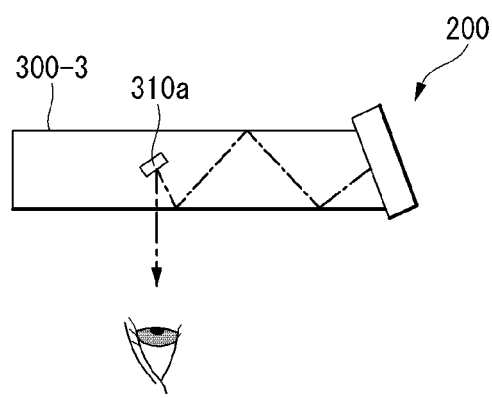
(a)
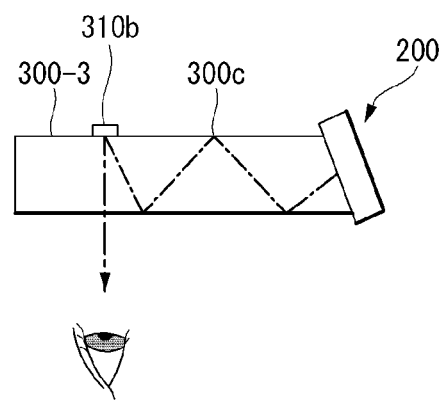
(b)
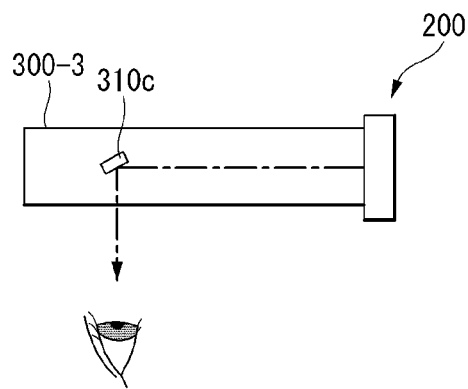
(c)
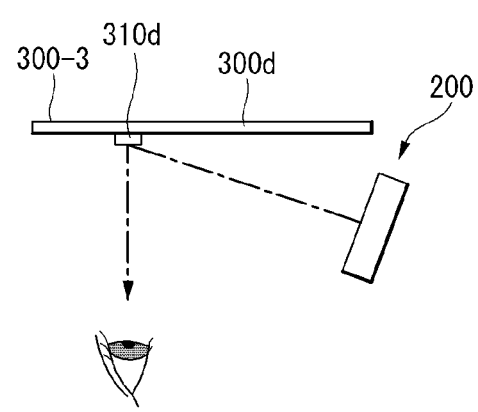
(d)

[Figure 10]
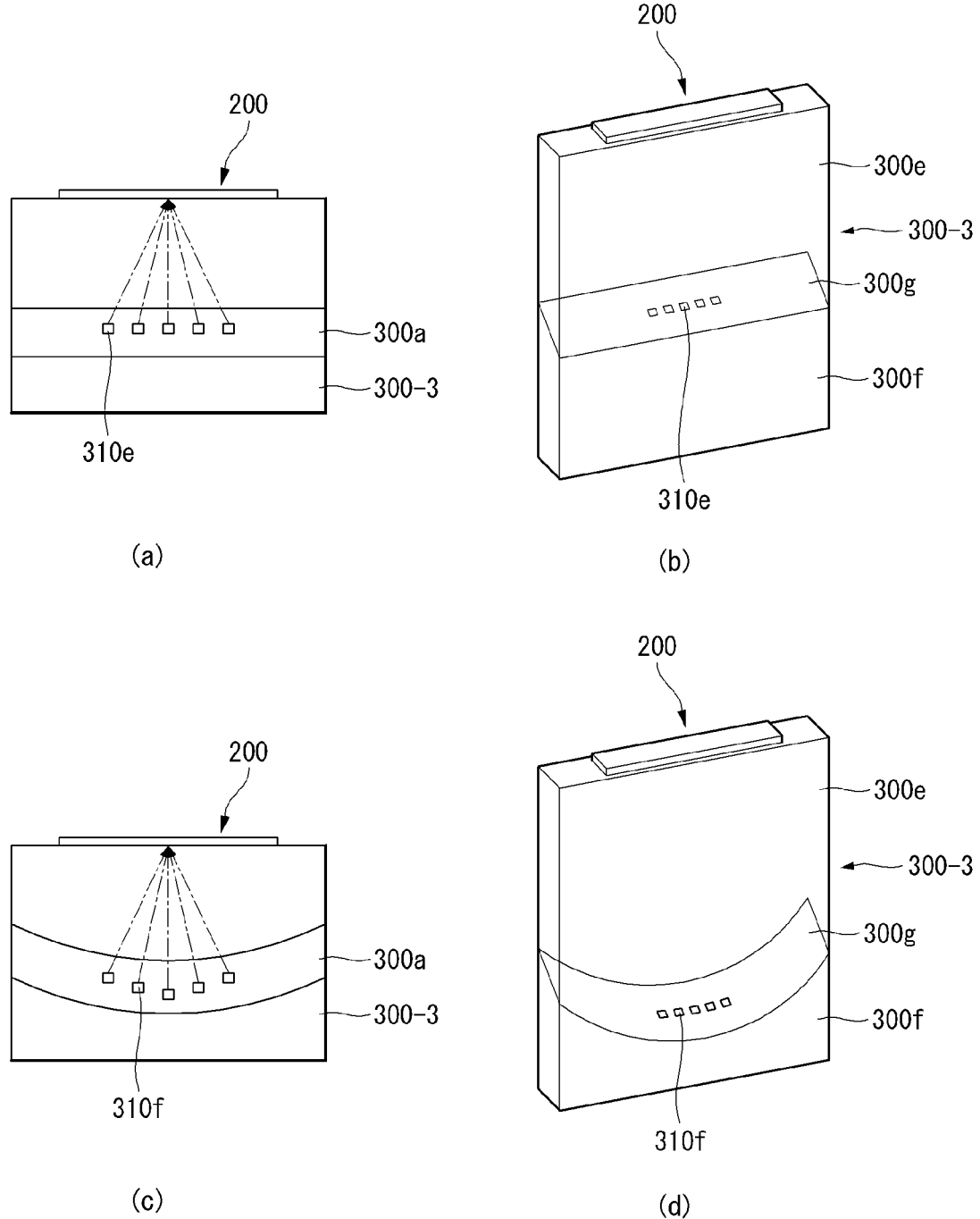

[Figure 11]
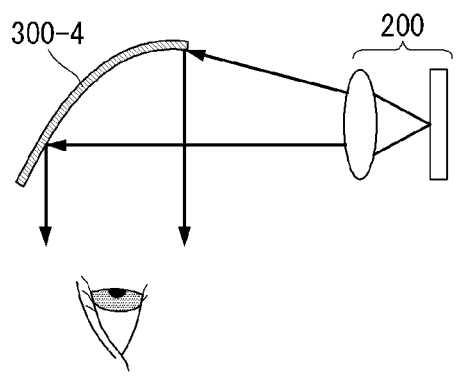
(a)
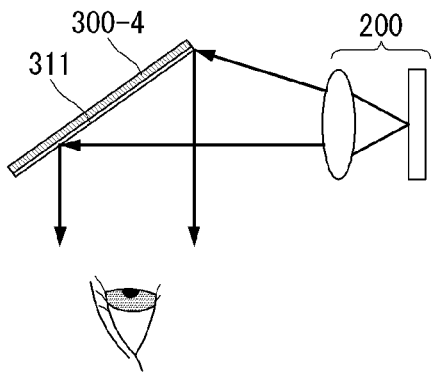
(b)
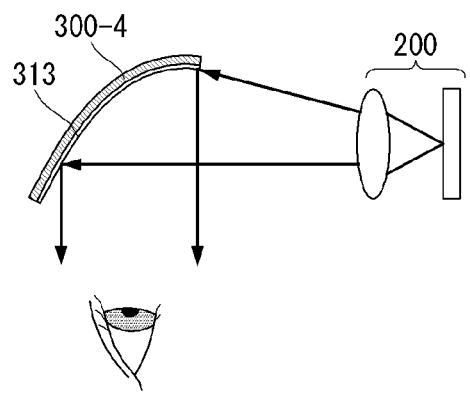
(c)

【Figure 12】
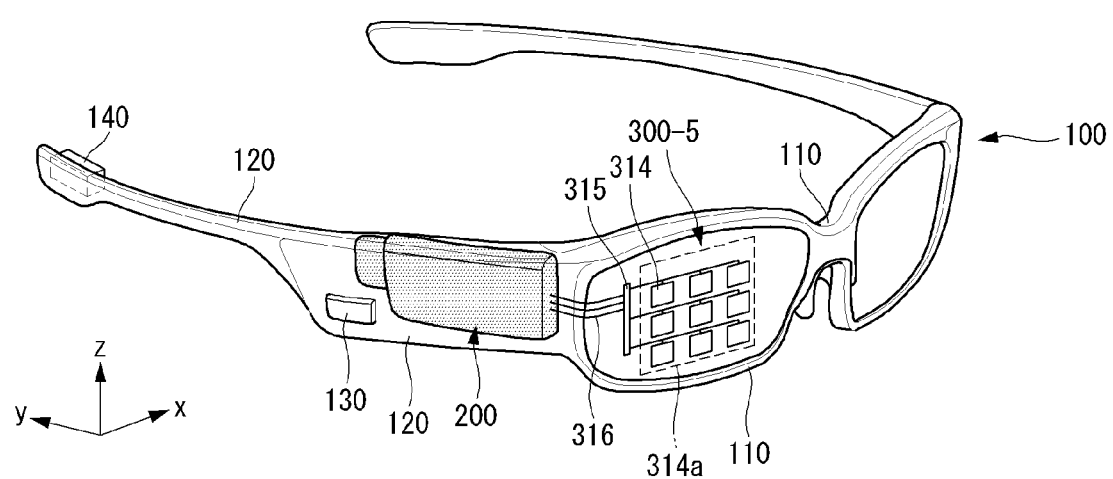

[Figure 13]
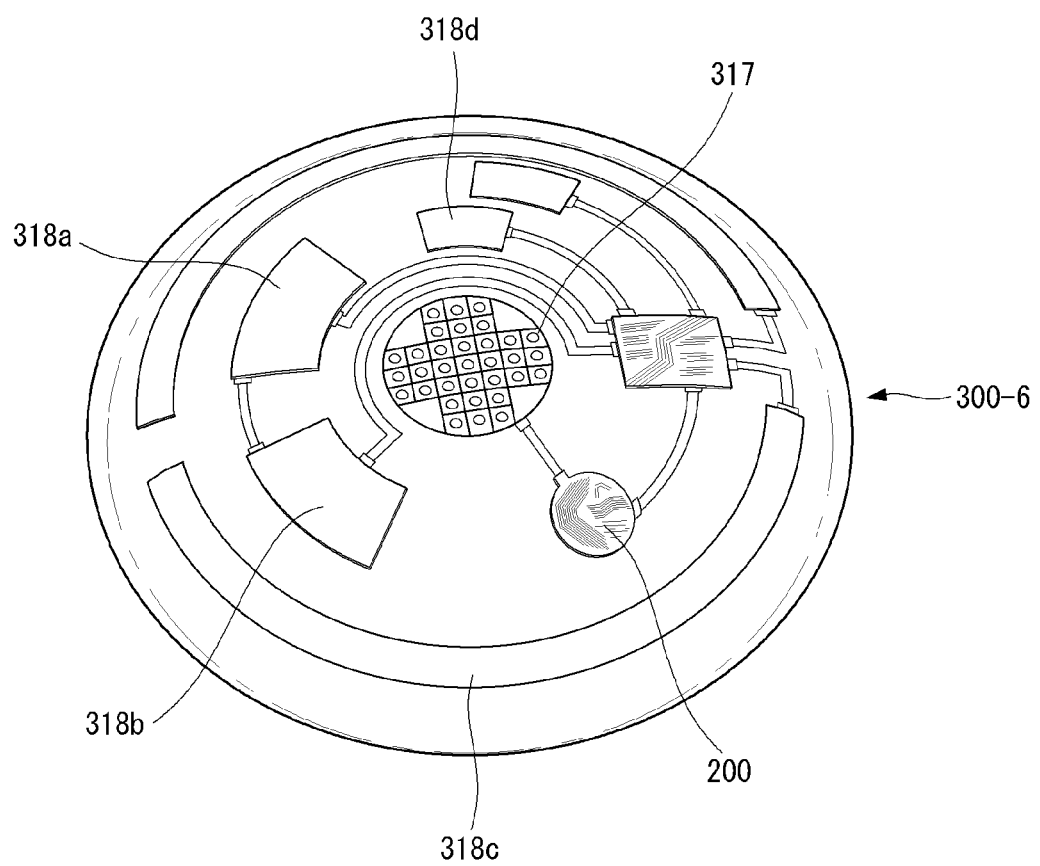

[Figure 14]
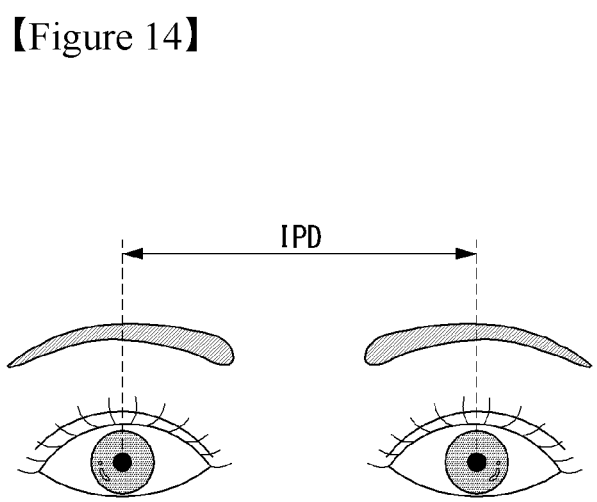

[Figure 15]
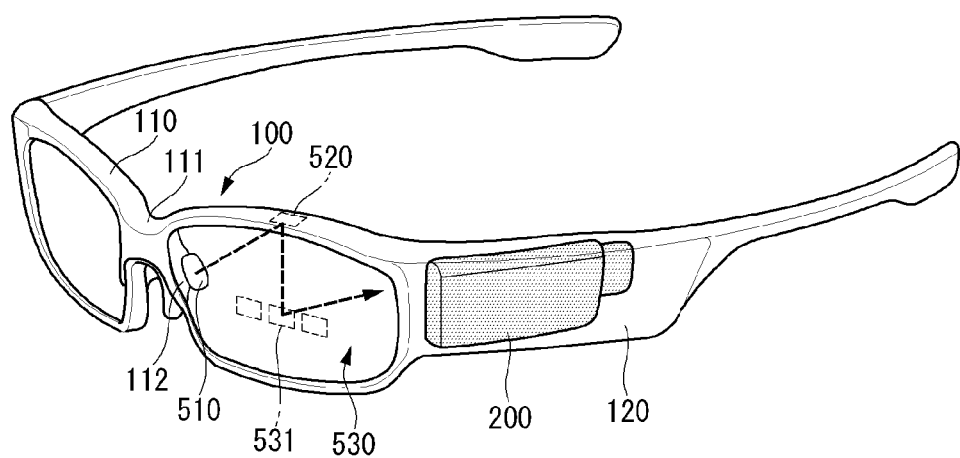

[Figure 16]
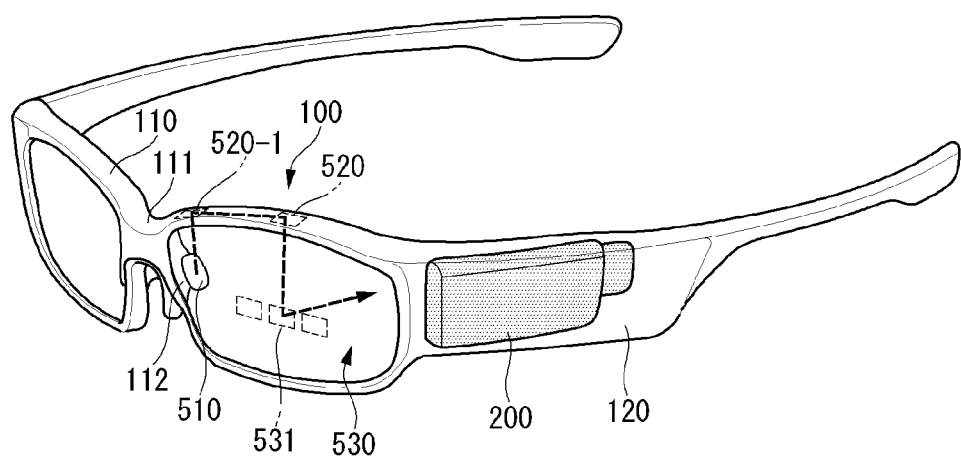

[Figure 17]
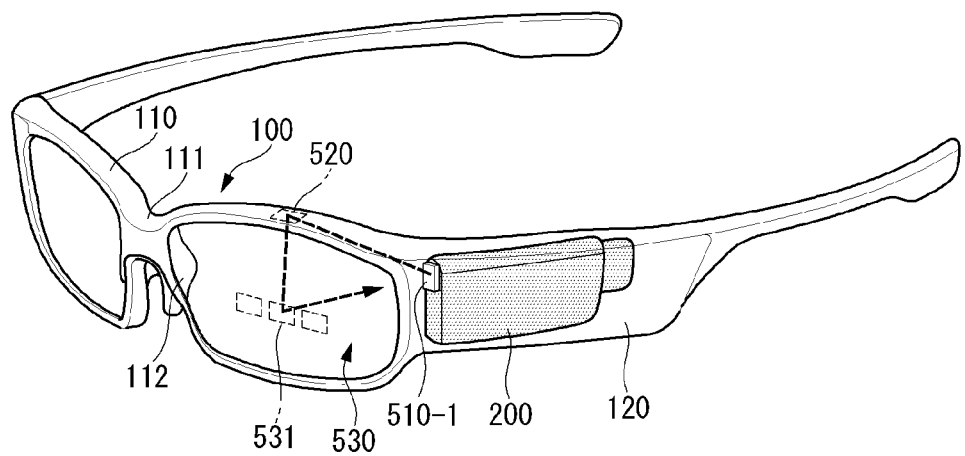

[Figure 18]
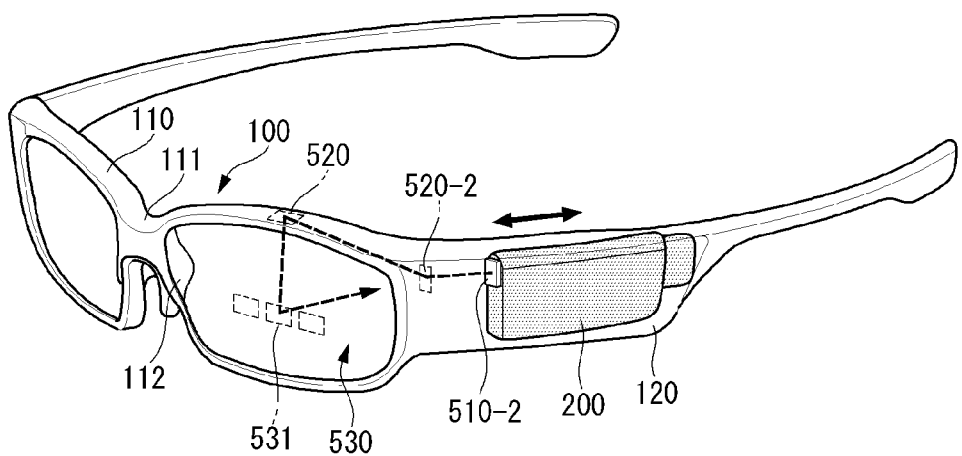

[Figure 19]
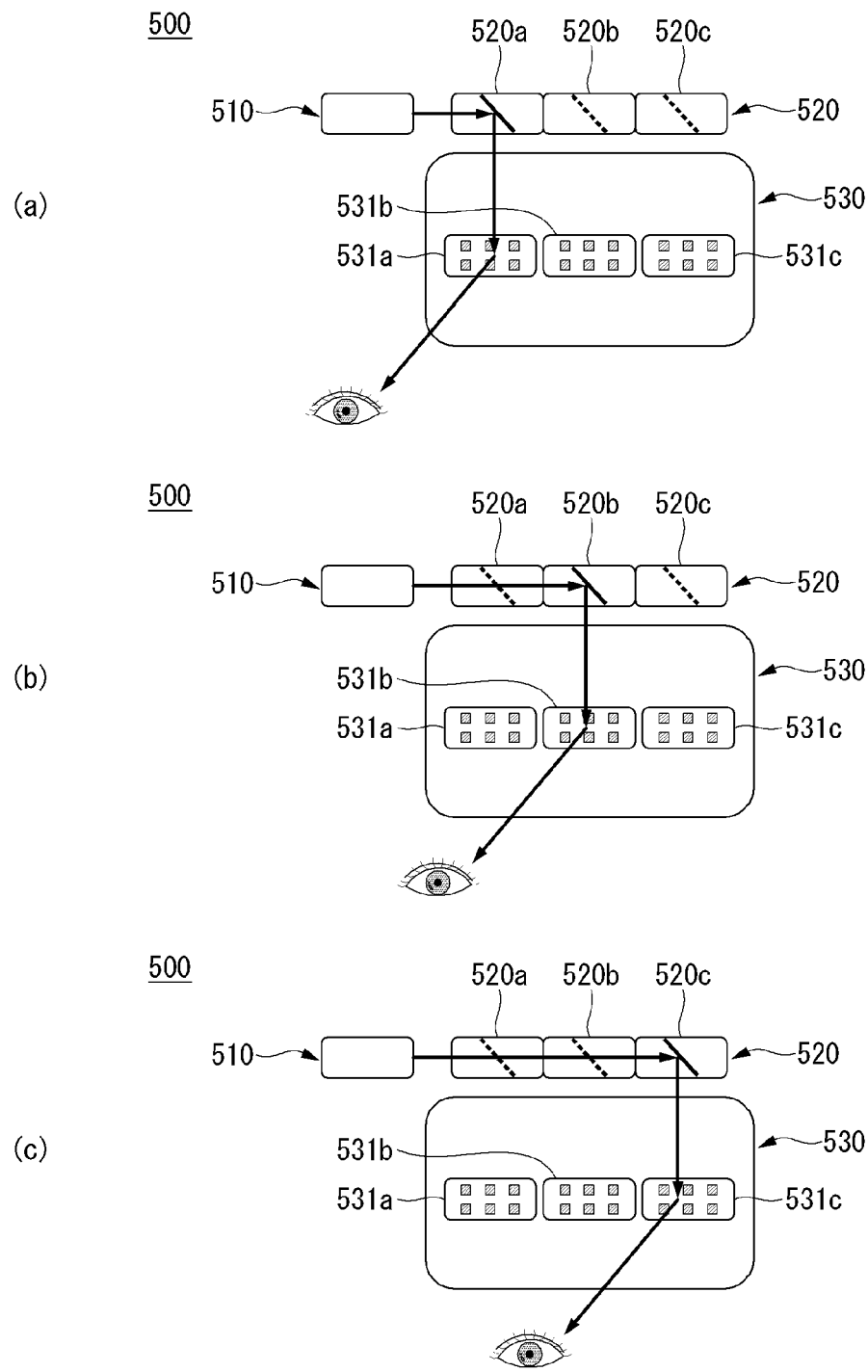

【Figure 20】
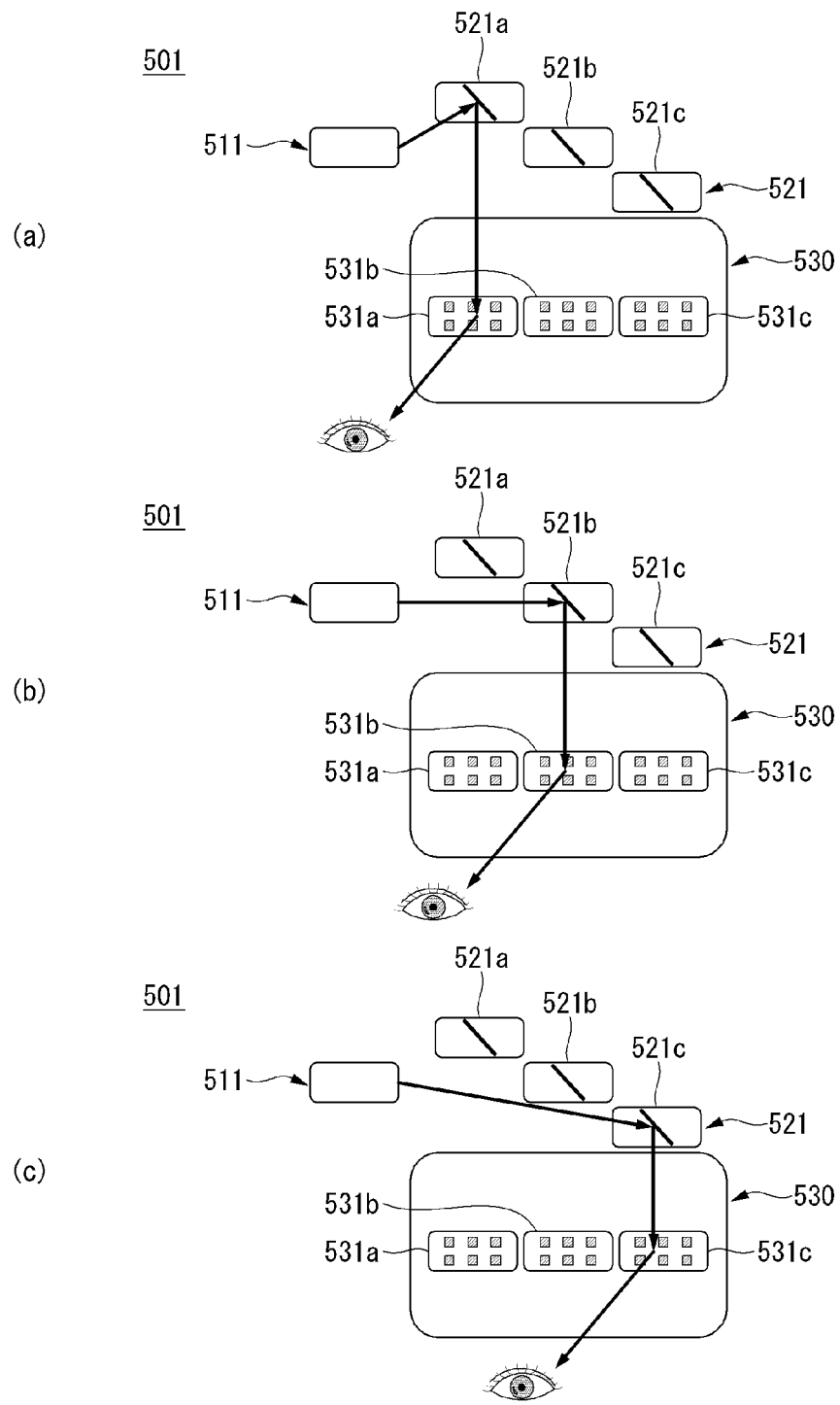

【Figure 21】
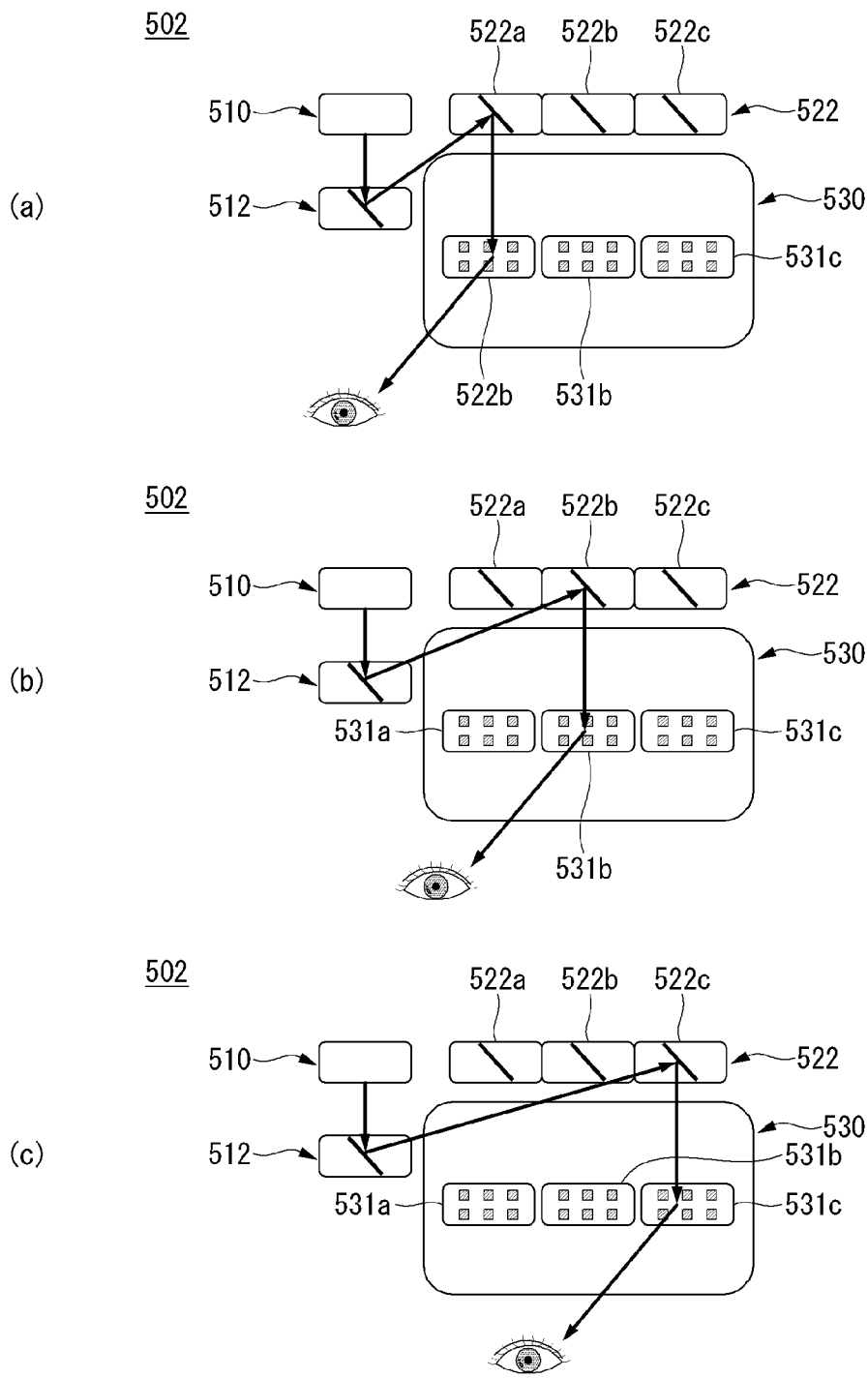

【Figure 22】
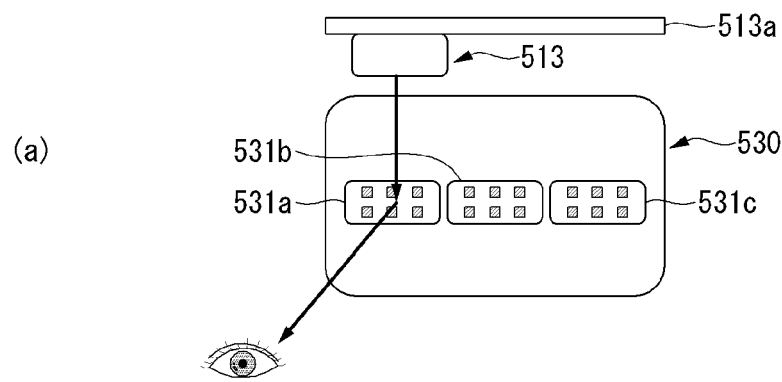
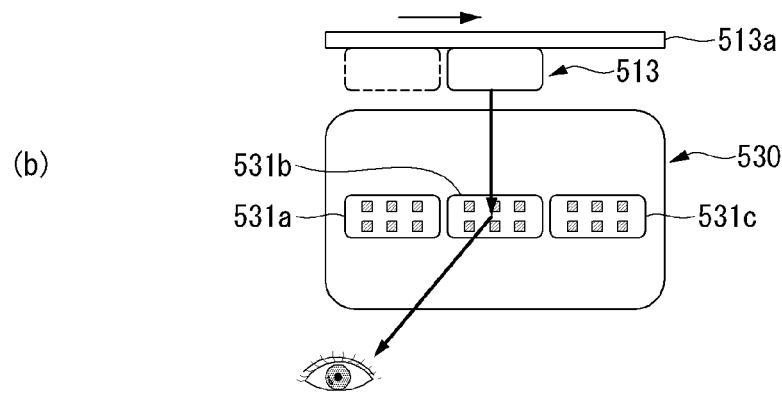
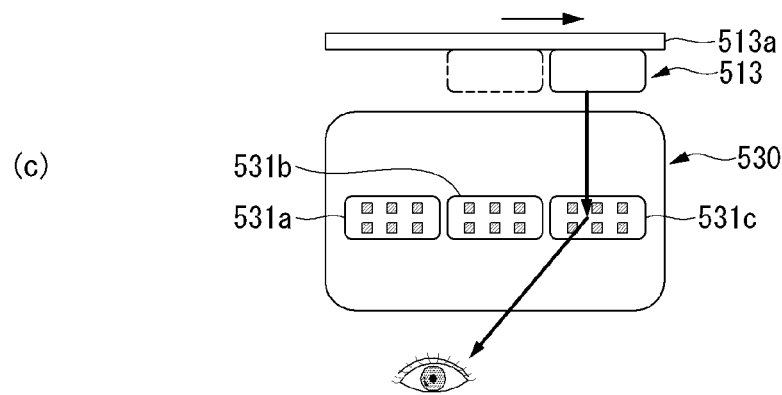

【Figure 23】
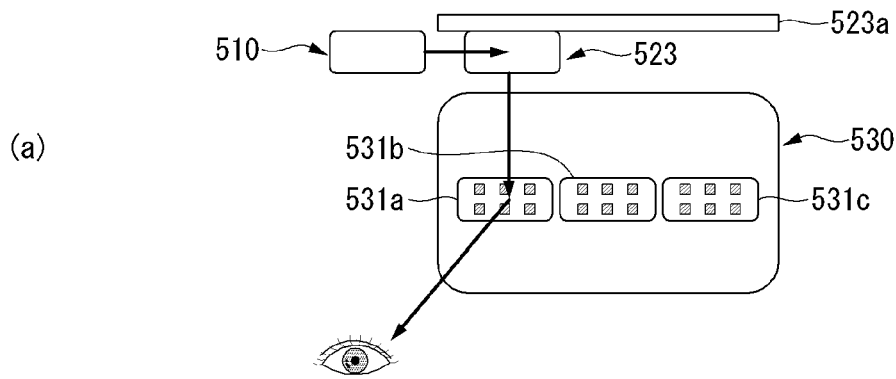
(a)
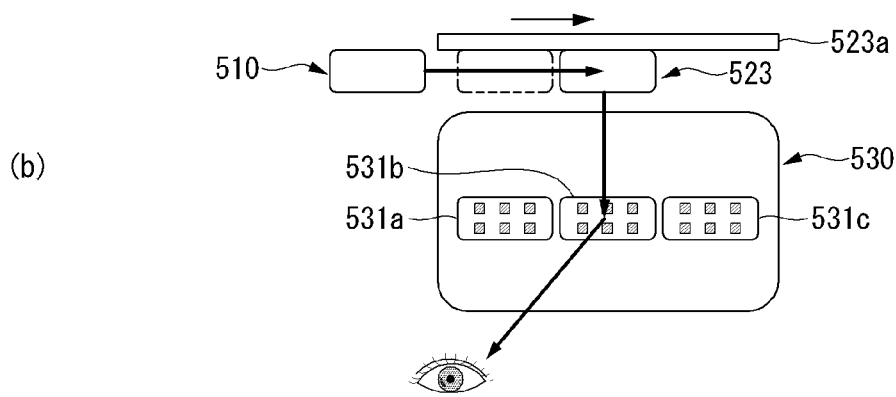
(b)
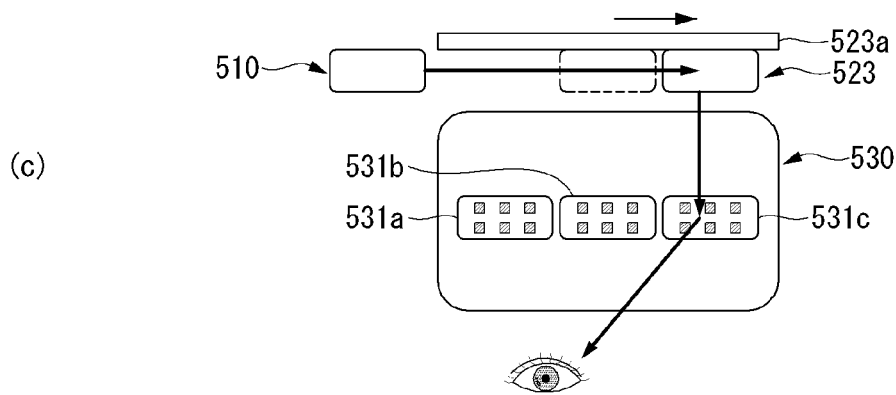
(c)

【Figure 24】
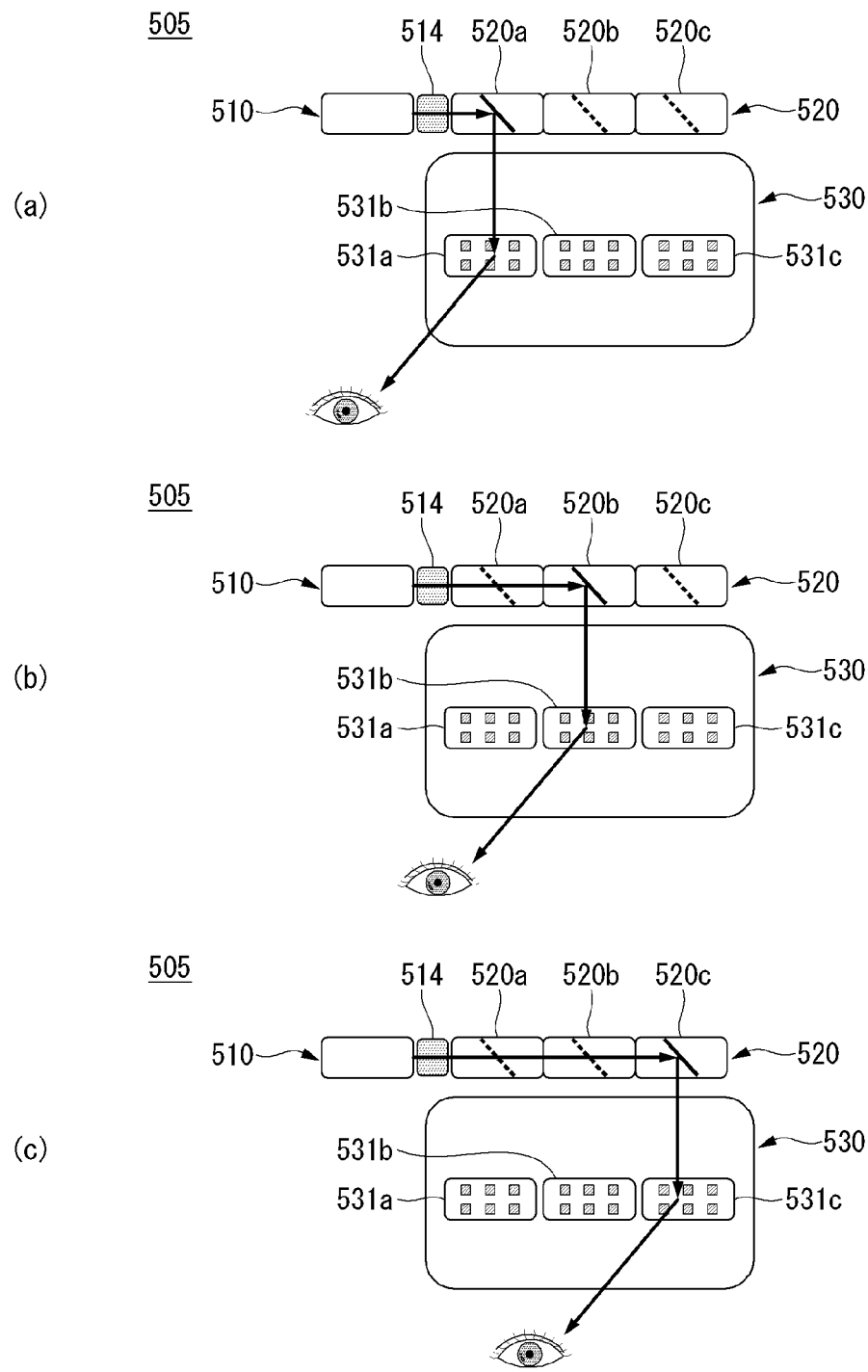

【Figure 25】
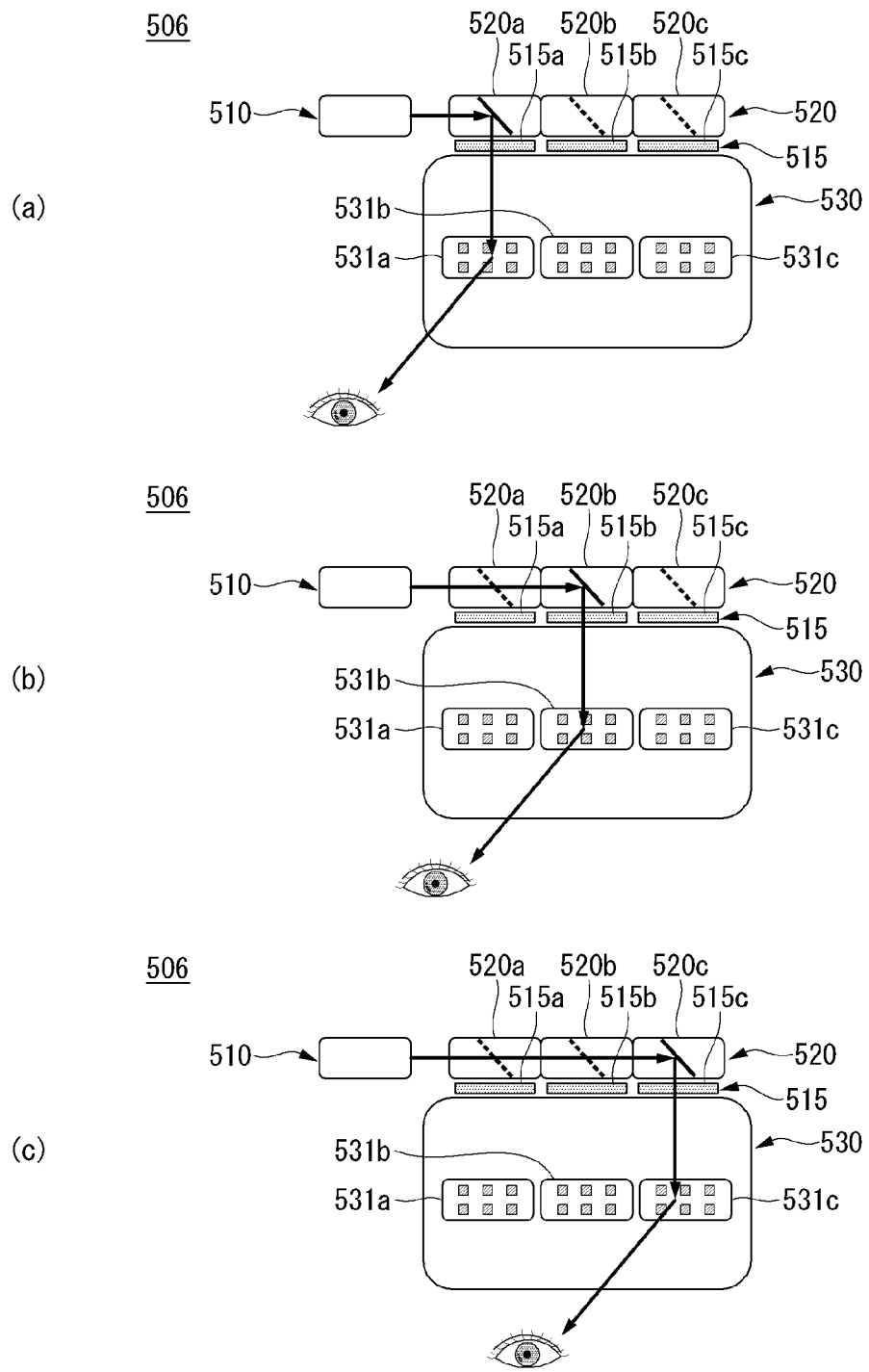

【Figure 26】
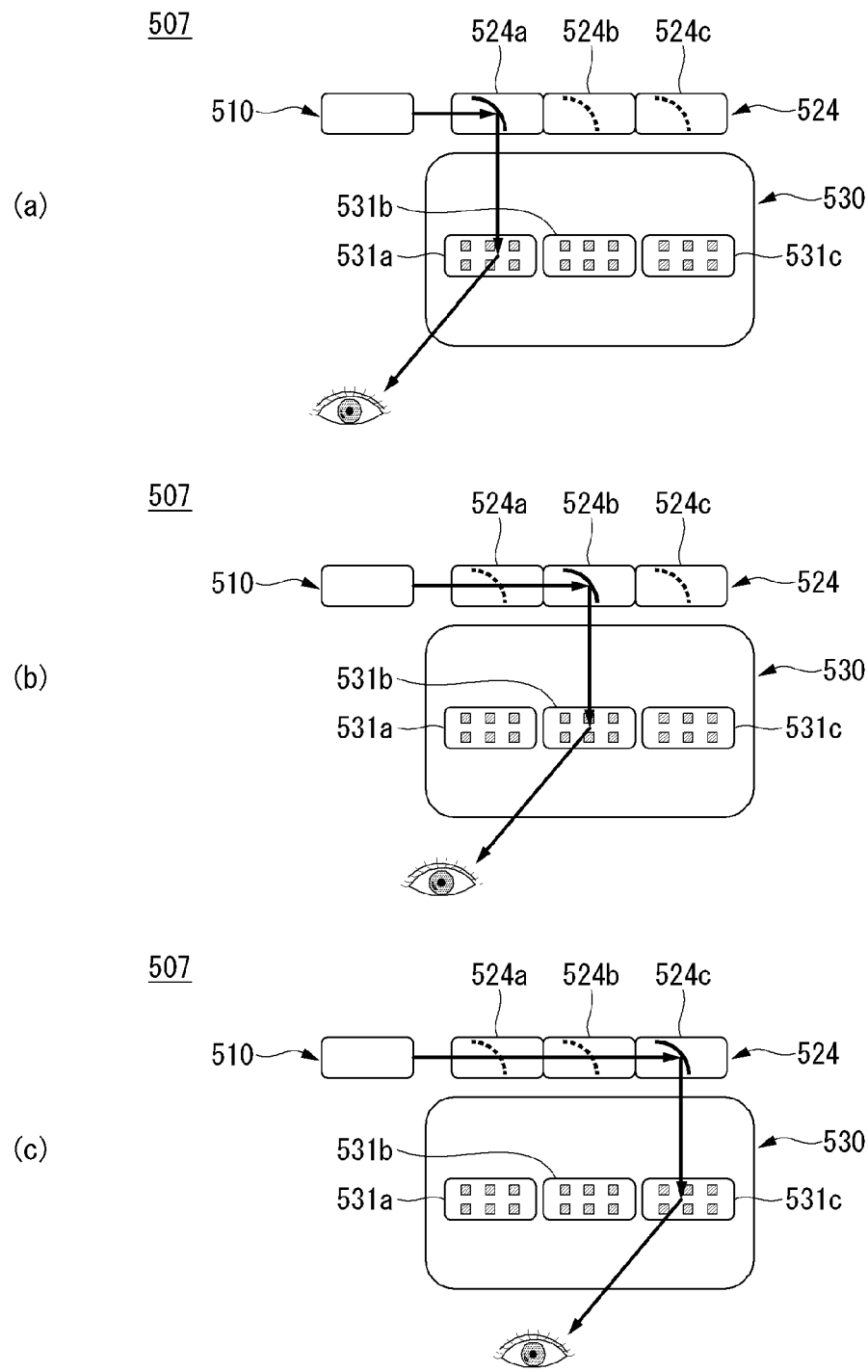

ELECTRONIC DEVICE

CROSS-REFERENCE TO RELATED APPLICATIONS

Pursuant to 35 U.S.C. § 119(a), this application claims the benefit of earlier filing date and right of priority to Korean Patent Application No. 10-2019-0105580, filed on Aug. 28, 2019, the contents of which are hereby incorporated by reference herein in its entirety.

BACKGROUND OF THE INVENTION

Field of the Invention

The present disclosure relates to an electronic device and, more particularly, to an electronic device used for Virtual Reality (VR), Augmented Reality (AR), and Mixed Reality (MR).

Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted. However, the reality is that there is not enough to solve the problem caused by the different pupil position for each user.

FIG. 14 is a diagram for explaining an IPD.

Referring to FIG. 14, IPD (Inter Pupillary Distance) refers to the distance of the line connecting the centers of the pupils of both eyes, and it usually has a value about 60 mm to 65 mm, although there are some differences depending on the individual, gender, and race.

See-through display refers to a display method that allows a user to view an external environment through a glass screen while viewing an image displayed on the glass screen, and uses various optical elements such as LCD, LED, or OLED.

In this case, since the path that the light is irradiated from the optical engine to the eye is predetermined in the manufacturing process of the product, there is a problem that it is difficult to vary from left to right according to the physical condition of the user.

In particular, when using a pin-mirror optical element, it is difficult to secure a wide EMB (Eye Motion Box) due to structural limitations, and it is difficult to cover a wide range of IPD. In other words, when the user has an IPD exceeding the acceptable range of the product (when the distance between the pupils is narrow or wide), the image on the screen cannot be clearly seen.

SUMMARY OF THE INVENTION

The object of the present disclosure is, in using an electronic device to be used in VR (Augmented Reality), AR (Augmented Reality), MR (Mixed Reality), etc., to provide an electronic device capable of changing the position of the optical device that reflects the image light correspondingly even when the distance between the pupil of the user is changed.

An electronic device according to an embodiment of the present disclosure comprises a display unit provided at a position corresponding to at least one of the left and right eyes of a user, the display unit including a lens and an optical element provided in the lens to transfer an image toward an eyeball of a user, and an image transfer unit for transferring an image provided from a controller to the optical element, wherein the image transfer unit is capable of varying the position of the optical element to which the image is transferred based on pupil position of the user.

Here, the display unit comprises a left eye lens provided at a position corresponding to a left eye of the user, a left eye optical element provided in the left eye lens, a right eye lens provided at a position corresponding to the right eye of the user, and a right eye optical element provided in the right eye lens, wherein the image transfer unit is capable of varying a distance between the left eye optical element and the right eye optical element, respectively to which an image provided from the controller is transferred based on the distance between the left eye pupil and the right eye pupil of the user.

Alternatively, the display unit further comprises a sensor for detecting the position of the pupil position in the eyeball of the user, and the controller may receive a signal from the sensor and transfer two or more different commands based on the pupil position of the user to the image transfer unit.

In addition, the electronic device further comprises a front frame supporting the left eye lens and the right eye lens, and a side frame connected to the front frame and supported on the head of the user, wherein the left eye optical element and the right eye optical element are each provided in plural in a direction connecting the left eye and the right eye of the user, and wherein the image transfer unit transfers the image in the controller as an optical signal, and may be provided in the front frame between the left eye lens and the right eye lens.

Here, the optical device is provided in plurality in the direction connecting the left and right eyes of the user, and wherein the image transfer unit further comprise a light emitting unit for transferring the image in the control unit as an optical signal, a light reflecting member which reflects the optical signal of the light emitting unit to transfer the optical signal to the optical element, and is provided in plurality to correspond to the plurality of optical elements, and wherein the image transfer unit may transfer an optical signal to the light reflecting members different from each other based on the pupil position of the user.

In addition, the light reflecting member may be provided to be switchable between a transmissive state for transmitting the optical signal transferred from the light emitting unit and a reflection state for reflecting the optical signal transferred from the light emitting unit.

Here, the light reflecting member is capable of being switched between the transmissive state and the reflection state according to a command of the controller.

Alternatively, a plurality of the light reflecting members are provided on a path of an optical signal provided from the light emitting unit, and comprises a first light reflecting member disposed closer to the light emitting unit and a second light reflecting member disposed farther from the emitting unit, and when the first light reflecting member is provided in the reflective state, an optical signal provided from the light emitting unit may be transferred to an optical element corresponding to the first light reflecting member among a plurality of the optical elements, when the first light reflecting member is provided in the transmissive state and the second light reflecting member is provided in the reflection state, the optical signal provided from the light emitting unit may be transferred to an optical element corresponding to the second light among the plurality of optical elements.

Further, the light emitting unit is provided to change the path of the optical signal to any one of a plurality of paths, and wherein the plurality of light reflecting members are provided on the plurality of paths, respectively.

Here, the light emitting unit is rotatably provided to change the path of the optical signal, and wherein the plurality of light reflecting members is disposed on the same plane as the light emitting unit.

Further, the image transfer unit further comprises an intermediate reflecting member reflecting the optical signals of the light emitting unit to transfer it to the plurality of light reflecting members, and wherein the image transfer unit may change a reflection path of an optical signal transferred from the light emitting unit by the intermediate reflecting member based on the pupil position of the user to transfer it to different light reflecting members.

Here, the intermediate reflecting member may be rotatably provided to change the reflection path of the optical signal, and wherein the plurality of light reflecting members may be disposed on the same plane as the intermediate reflecting member.

Further, the optical device is provided in plurality in one direction, and wherein the image transfer unit comprises a light emitting unit for transferring an image in the control unit to the optical element as an optical signal, and wherein the light emitting unit may be provided to be movable and transfers an optical signal to the optical elements different based on the pupil position of the user.

Here, the light emitting unit is provided to be movable in parallel to the direction in which the plurality of optical elements is arranged.

Further, the optical device is provided in plurality in one direction, and wherein the image transfer unit further comprises a light emitting unit for transferring the image in the control unit as an optical signal, and a light reflecting member for reflecting the optical signal of the light emitting unit to transfer it to the optical element, and wherein the light reflecting member may be provided to be movable and transfer an optical signal to the optical elements different from each other based on the pupil position of the user.

Here, the light reflecting member is provided to be movable in parallel to a direction in which the plurality of optical elements is arranged.

Further, the image transfer unit comprises a refractive member disposed between the light emitting unit and the optical element, and wherein the refractive member may compensate for a difference in an image caused by a difference in distance between each of the optical elements from the light emitting unit.

In this case, the refractive member may be disposed on an optical path between the light emitting unit and the reflecting member, and an optical power may be varied so as to compensate for a difference in distance between the optical elements from the light emitting unit.

Alternatively, the reflecting member includes a first reflecting member and a second reflecting member, and wherein the optical element includes a first optical element and a second optical element, wherein the refractive member includes a first refractive member disposed on an optical path between the first reflective member and the first optical element, and a second refractive member disposed on an optical path between the second reflective member and the second optical element, and wherein the first refractive member and the second refractive member may have different optical powers so as to compensate for a difference in distance between the first optical element or the second optical element corresponding to each of the light emitting unit.

Further, the light reflecting member may be provided to have a refractive index different from each other so as to compensate for a difference in an image caused by a difference in distance between the optical elements corresponding to the plurality of light reflecting members from the light emitting unit.

The electronic device according to the present disclosure varies the optical elements reflecting the image light among the optical elements mounted on the lens corresponding to the distances between the various pupils, thereby capable of clearly viewing an image even in the case of a user having a narrow or wide distance between the pupils than the standard case.

In addition, according to at least one of the embodiments of the present disclosure, a structure capable of varying the refractive power is employed and thus it is to solve the problem that the optical path is changed when the optical element reflecting the image light among the optical elements mounted on the lens is varied.

BRIEF DESCRIPTION OF THE DRAWINGS

FIG. 1 illustrates one embodiment of an AI device.

FIG. 2 is a block diagram illustrating the structure of an eXtended Reality (XR) electronic device according to one embodiment of the present disclosure.

FIG. 3 is a perspective view of a VR electronic device according to one embodiment of the present disclosure.

FIG. 4 illustrates a situation in which the VR electronic device of FIG. 3 is used.

FIG. 5 is a perspective view of an AR electronic device according to one embodiment of the present disclosure.

FIG. 6 is an exploded perspective view of a controller according to one embodiment of the present disclosure.

FIGS. 7 to 13 illustrate various display methods applicable to a display unit according to one embodiment of the present disclosure.

FIG. 14 is a diagram for explaining an IPD.

FIG. 15 is a perspective view showing an electronic device according to a first embodiment of the present disclosure.

FIG. 16 is a perspective view showing an electronic device according to a second embodiment of the present disclosure.

FIG. 17 is a perspective view showing an electronic device according to a third embodiment of the present disclosure.

FIG. 18 is a perspective view showing an electronic device according to a fourth embodiment of the present disclosure.

FIG. 19 is a schematic diagram for briefly explaining a configuration of an image transfer unit 500 according to a first embodiment of the present disclosure.

FIG. 20 is a schematic view for briefly explaining the configuration of the image transfer unit 501 according to a second embodiment of the present disclosure.

FIG. 21 is a schematic diagram for briefly explaining the configuration of the image transfer unit 502 according to a third embodiment of the present disclosure.

FIG. 22 is a schematic diagram for briefly explaining a configuration of an image transfer unit 503 according to a fourth embodiment of the present disclosure.

FIG. 23 is a schematic view for briefly explaining a configuration of an image transfer unit 504 according to a fifth embodiment of the present disclosure.

FIG. 24 is a schematic diagram for briefly explaining a configuration of an image transfer unit 505 according to a sixth embodiment of the present disclosure.

FIG. 25 is a schematic diagram for briefly explaining a configuration of an image transfer unit 506 according to a seventh embodiment of the present disclosure.

FIG. 26 is a schematic diagram for briefly explaining the configuration of the image transfer unit 507 according to an eighth embodiment of the present disclosure.

DESCRIPTION OF EXEMPLARY EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b)

in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

FIG. 5 is a perspective view of an AR electronic device according to one embodiment of the present disclosure.

As shown in FIG. 5, the electronic device according to one embodiment of the present disclosure may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

FIG. 6 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7 to 13 illustrate various display methods applicable to the display unit 300 according to one embodiment of the present disclosure.

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display unit used for contact lenses.

As shown in FIG. 7, the display unit 300-1 according to one embodiment of the present disclosure may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display unit 300-2 according to another embodiment of the present disclosure may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(*e*), and glass optical element having an active grating as shown in FIG. 8(*f*).

As shown in FIG. 8(*a*), the segmented beam splitter-type glass optical element may have a total reflection mirror 301*a* where an optical image is incident and a segmented beam splitter 301*b* where an optical image is emitted.

Accordingly, the optical image generated by the controller 200 is totally reflected by the total reflection mirror 301*a* inside the glass optical element, and the totally reflected optical image is partially separated and emitted by the partial reflection mirror 301*b* and eventually perceived by the user while being guided along the longitudinal direction of the glass.

In the case of the saw tooth prism-type glass optical element as shown in FIG. 8(*b*), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(*c*) may have a first diffraction unit 303*a* on the surface of the part on which the optical image is incident and a second diffraction unit 303*b* on the surface of the part from which the optical image is emitted. The first and second diffraction units 303*a*, 303*b* may be provided in a way that a specific pattern is patterned on the surface of the glass or a separate diffraction film is attached thereon.

Accordingly, the optical image generated by the controller 200 is diffracted as it is incident through the first diffraction unit 303*a*, guided along the longitudinal direction of the glass while being totally reflected, emitted through the second diffraction unit 303*b*, and eventually perceived by the user.

The glass optical element having a Hologram Optical Element (HOE) as shown in FIG. 8(*d*) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(*e*) may have an in-coupler 305*a* on the opposite surface of the glass surface on which the optical image is incident and an out-coupler 305*b* on the opposite surface of the glass surface from which the optical image is emitted. Here, the in-coupler 305*a* and the out-coupler 305*b* may be provided in the form of film having a passive grating.

Accordingly, the optical image incident on the glass surface at the light-incident side of the glass is totally reflected by the in-coupler 305*a* installed on the opposite surface, guided along the longitudinal direction of the glass, emitted through the opposite surface of the glass by the out-coupler 305*b*, and eventually perceived by the user.

The glass optical element having an active grating as shown in FIG. 8(*f*) may have an in-coupler 306*a* formed as an active grating inside the glass through which an optical image is incoming and an out-coupler 306*b* formed as an active grating inside the glass from which the optical image is emitted.

Accordingly, the optical image incident on the glass is totally reflected by the in-coupler 306*a*, guided in the longitudinal direction of the glass, emitted to the outside of the glass by the out-coupler 306*b*, and eventually perceived by the user.

The display unit 300-3 according to another embodiment of the present disclosure may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9 and 10.

Referring to FIG. 9(*a*), the pinhole mirror 310*a* may be provided on the path of incident light within the display unit 300-3 and reflect the incident light toward the user's eye. More specifically, the pinhole mirror 310*a* may be disposed between the front surface (outer surface) and the rear surface (inner surface) of the display unit 300-3, and a method for manufacturing the pinhole mirror will be described again later.

The pinhole mirror 310*a* may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310*a* through internal total reflection.

Referring to FIG. 9(*b*), the pinhole mirror 310*b* may be provided on the surface 300*c* through which light is totally reflected in the display unit 300-3. Here, the pinhole mirror 310*b* may have the characteristic of a prism that changes the path of external light according to the user's eyes. For example, the pinhole mirror 310*b* may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310*b* installed on the surface on which external light is incident, and the reflected light may pass through the display unit 300-3 to reach the user's eyes.

Referring to FIG. 9(*c*), the incident light illuminated by the controller 200 may be reflected by the pinhole mirror 310*c* directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 9(*d*), the light illuminated by the controller 200 may reach the user's eyes by being reflected within the display unit 300-3 by the pinhole mirror 310*d* installed on the surface 300*d* from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present disclosure.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present disclosure may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(c) may have a HOE 313 coated or patterned on the surface of freeform glass, where the operating principles may be the same as described with reference to FIG. 11(b).

In addition, a display unit 300-5 employing micro LED as shown in FIG. 12 and a display unit 300-6 employing a contact lens as shown in FIG. 13 may also be used.

Referring to FIG. 12, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present disclosure may include a retina scan method.

FIG. 15 is a perspective view showing an electronic device according to a first embodiment of the present disclosure.

Referring to FIG. 15, the electronic device according to the first embodiment of the present disclosure may include a frame 100, an image transfer unit 500 for transferring an image provided from the controller 200 and a display unit 530 for displaying an image to a user.

The frame 100 may include a front frame 110 and a pair of side frames 120 extending rearward from both sides of the front frame 110. In some cases, any one of the front frame 110 or the side frame 120 may be omitted, or only one side frame 120 may be connected to the front frame 110.

The front frame 110 may be provided in a structure capable of supporting a pair of display units 530 corresponding to both eyes of the user. For example, the display unit 530 may be provided in the form of a glass frame surrounding the lens of the display unit 530. Alternatively, it may be provided in the form of supporting only the upper or lower portion of the lens, or supporting only one side of the lens.

Alternatively, the front frame 110 may be provided to support only one display unit 530 corresponding to one eye of both eyes of the user.

The frame 100 may include a connection part 111 connecting the inside of the front frame 110 supporting the display unit 530 corresponding to the left eye of the user and the inside of the front frame 110 supporting the display unit 530 corresponding to the right eye of the user, and a nose support 112 provided in proximity to the connection part 111 and placed on the nose of a user. The nose support 112 may be provided integrally with the front frame 110 or provided as a separate member to be combined.

The image transfer unit 500 may include a light emitting unit 510 converting the image signal transferred from the controller 200 into an optical signal to irradiate it, and a light reflecting member 520 reflecting the image light propagated from the light emitting unit 510 to the element 531 of the display unit 530.

The light emitting unit 510 may be represented by an optical engine. The light emitting unit 510 may be connected to the front end of the controller 200 or may be integrally formed with the controller 200.

The light reflecting member 520 may be provided as a mirror capable of reflecting an optical image incident from the light emitting unit 510. The light reflecting member 520 may be provided in plurality to reflect light images to different regions, or one light reflecting member 520 may be provided to change the reflection angle.

The display unit 530 includes a transparent lens capable of transmitting light and an optical element 531 mounted to the lens.

The optical element 531 may be an optical element in which an optical signal irradiated from the light emitting unit 510 is directly incident toward the eyeball of a user, or an optical element in which an optical signal irradiated from the light emitting unit 510 reflects the light to be incident reflected by the light reflecting member 520 toward the eyeball of a user, The optical element 531 includes a pin-mirror. The optical image irradiated from the light emitting unit 510 may become clear as an image is formed on the retina of the eye as depth of field (DOF) passing through the pin mirror deeps.

The optical device 531 may be provided in plurality in the horizontal direction (direction connecting the left eye and the right eye). In addition, the light reflection members 520 may be provided in plurality corresponding to the optical elements 531.

The image transfer unit 500 according to the embodiment of the present disclosure may lengthen the light path by a method of changing the position of the light emitting unit 510, using the reflective member 520, or the like.

The light path is a distance from which the light image irradiated from the light emitting unit 510 reaches the pupil of a user. If the length of the optical path is longer, the focal length can be secured, and the pinhole size of the pin mirror, which is the optical element 531, can be increased, thereby increasing the amount of light, thereby ensuring a bright screen. In addition, when comparing the two cases having the same amount of light, the longer length of the light path can drive the light emitting unit at lower power.

Since there are big advantages resulting from the longer optical path, total internal reflection may be used as shown in FIGS. 9A and 9B to lengthen the optical path. However, as the thickness of the lens becomes thinner, there is a limit in securing the optical path, and in order to secure the optical path, there is a problem that a complex structure must be formed in the lens.

Further, when the light emitting unit 510 is positioned above the display 530, in addition to the problem of shortening the optical path, the aesthetic view is not good as the front frame 110 should be thick enough to accommodate the light output part 510, and there is a problem that the pinhole size should be small to secure the focal length.

Referring to FIG. 15, the light emitting unit 510 may be extended inwardly (the direction toward the user) from the connection part 111 connecting the front frame 110 corresponding to both eyes to be provided to the nose support 112 supported on the nose or the like. In more detail, the nose support 112 may be arranged to emit an optical image in a direction facing the nose of a user, i.e., facing the adjacent display unit 530.

For example, the controller 200 for generating an image signal is provided in the side frame 120, and the signal line connecting the controller 200 and the light emitting unit 510 may be connected by wire through the front frame 110 above the display unit 530. Alternatively, it may include the case that the light emitting unit 510 may be wirelessly connected to the controller 200.

In addition, the light reflection member 520 may be provided in the front frame 110 above the display unit 530. For example, the light reflecting member 520 may be positioned above the optical element 531, and disposed so that the incident angle of the light incident from the light emitting unit 510 is the same as the reflection angle of the light reflected by the optical element 531.

FIG. 16 is a perspective view showing an electronic device according to a second embodiment of the present disclosure.

Referring to FIG. 16, the light emitting unit 510 may be provided in the nose support 112, and the light reflecting members 520 and 520-1 may be provided in plurality.

The light reflecting member may include a first light reflecting member 520-1 that is relatively close to the light emitting unit 510 and a second light reflecting member 520 that is relatively close to the optical element 531. For example, the first light reflecting member 520-1 may be disposed at a position close to the connecting portion 111 in the front frame 110, and the second light reflecting member 520 is disposed above the optical element 531. The light image irradiated from the light emitting unit 510 is sequentially reflected by the first light reflecting member 520-1 and the second light reflecting member 520 and is incident on the optical device 531.

As the light reflecting members 520 and 520-1 are added, the light path may be longer, and three or more light reflecting members may be used unlike the drawings.

FIG. 17 is a perspective view showing an electronic device according to a third embodiment of the present disclosure.

Referring to FIG. 17, the light emitting unit 510-1 may be provided in the side frame 120, and the light reflecting member 520 may be provided in the front frame 110 above the display unit 530. For example, the light reflecting member 520 may be positioned above the optical element 531, and disposed so that the incident angle of the light incident from the light emitting unit 510 is the same as the reflection angle of the light reflected by the optical element 531.

The light emitting unit 510-1 may be connected to the front of the controller 200 and may be integrally formed with the controller 200. Alternatively, unlike the drawing, the light emitting unit 510-1 may be disposed on the front frame 110 adjacent to the side frame 120.

In addition, the light path may be lengthened by moving the light reflection member 520 to a position close to the connection part 111. In this case, the incident angle and the reflection angle of the light reflection member 520 may be adjusted to dispose the light reflection member 520.

FIG. 18 is a perspective view showing an electronic device according to a fourth embodiment of the present disclosure.

Referring to FIG. 18, the light emitting unit 510-1 may be provided in the side frame 120, and the light reflecting members 520 and 520-2 may be provided in plurality.

The light emitting unit 510-1 may be connected to the front of the controller 200 and may be integrally formed with the controller 200. In comparison with FIG. 17, the light emitting unit 510-1 may be positioned at the rear of the side frame 120. An optical path may be secured as the light emitting unit 510-1 moves rearward.

In addition, the light emitting unit 510-1 may be provided to be retractable. The structure for retracting the light emitting unit 510-1 may use a motor and a rack-pinion gear assembly, and includes all to be moved through other mechanical structures.

Since the light path changes as the light emitting unit 510-1 retracts forward and backward, the side effects of changing the light path may be varied by adjusting the position of the light emitting unit 510-1. For example, the distance between the pupil of a user and the display unit 530 may be changed to solve a problem in which the focus is not finely adjusted, and the like.

The light reflecting member may include a first light reflecting member 510 disposed relatively closer to the light emitting unit 510-1 and a second light reflecting member 520 disposed relatively closer to the optical element 531.

The first light reflecting member 520-2 may be disposed close to a position where the side frame 120 and the front frame 110 are connected to each other. The first light reflecting member 520-2 may reflect the light image irradiated from the light emitting unit 510-1 to the second light reflecting member 520. For example, the light emitting unit 510-1 and the first light reflecting member 520-2 may be accommodated in the side frame 120, and on the side frame 120, a path is formed through which the optical image is transferred between the light emitting unit 510-1 and the first light reflection member 520-2 and the exit of the reflected light of the first light reflection member 520-2 may be open.

The second light reflecting member 520 may be provided in the front frame 110 above the display unit 530. For example, the light reflecting member 520 is positioned above the optical element 531, and may be disposed so that the incident angle of the light incident from the light emitting unit 510 is the same as the reflection angle of the light reflected by the optical element 531.

The light image irradiated from the light emitting unit 510-1 is sequentially reflected by the first light reflecting member 520-2 and the second light reflecting member 520 and is incident on the optical element 531.

As the light reflecting member is added, the light path may be made longer, and unlike the drawings, three or more light reflecting members may be used.

In addition, the light path may be lengthened by moving the light reflection member 520 to a position close to the connection part 111. In this case, the incident angle and the reflection angle of the light reflection member 520 may be adjusted to dispose the light reflection member 520.

FIG. 19 is a schematic diagram for briefly explaining a configuration of an image transfer unit 500 according to a first embodiment of the present disclosure.

The image transfer unit 500 according to the first embodiment includes a light emitting unit 510 and a plurality of light reflecting members 520. The display unit 530 includes a plurality of optical elements 531 corresponding to the light reflecting member 520. Here, the optical element 531 may refer to an area in which individual optical element cells are grouped. The optical element cells may be arranged in one direction and arranged in a lattice form The optical elements 531 may be arranged side by side in the horizontal direction (the direction connecting the pupils in both eyes of the user). In addition, three or more optical elements 531 may be disposed in the horizontal direction. Taking the display unit 530 corresponding to the right eye as an example, the display unit 530 includes three optical elements 531a, 531b, and 531c, among which the second optical element 531b positioned in the middle is provided at a position corresponding to the IPD of a normal range, and the first optical element 531a positioned at the inner side (left side) than the second optical element 531b is provided at a position corresponding to the IPD narrower than the normal range, and the third optical element 531c positioned at the outer side (right side) than the second optical element 531b is provided at a position corresponding to the IPD wider than the normal range.

In addition, the light reflecting member 520 corresponds to a first optical element 531a, corresponds to a first light reflecting member 520a and a second optical element 531b positioned thereon, and corresponds to a second light reflecting member 520b and a third optical element 531c positioned thereon, and includes a third light reflecting member 520c positioned thereon.

In addition, the first to third light reflecting members 520a, 520b, and 520c may be disposed in parallel with the light signal irradiated from the light emitting unit 510.

Each of the light reflecting members 520a, 520b, and 520c may be provided as a switchable mirror. Switchable mirrors include both mechanical and electrical methods. For example, the mechanical switchable mirror means to rotate the mirror to convert between an on state that reflects the light incident from the light emitting unit 510 toward the optical element 531 and an off state that passes through the light incident from the light emitting unit 510 as it is. In addition, the electric switchable mirror may be switched to the on state when an electric signal is supplied, and may be switched to the off state when an electric signal is blocked.

Referring to FIG. 19(a), the first light reflecting member 520a is provided in the on state and the second and third light reflecting members 520b and 520c are provided in the off state. Therefore, the light image incident from the light emitting unit 510 is reflected by the first light reflecting member 520a and is incident on the first optical element 531a, and transfers the image to a position suitable for a user with a narrow IPD.

Referring to FIG. 19(b), the second light reflecting member 520b is provided in the on state and the first and third light reflecting members 520a and 520c are provided in the off state. Therefore, the light image incident from the light emitting unit 510 is reflected by the second light reflecting member 520b while passing through the first light reflecting member 520a and is incident on the second optical element 531b, and transfers the image to a position suitable for a user with an average IPD Referring to FIG. 19(c), the third light reflecting member 520c is provided in the state and the first and second light reflecting members 520a and 520b are provided in the off state. Therefore, the light image incident from the light emitting unit 510 is reflected by the third light reflecting member 520c while passing through the first and second light reflecting members 520b and 520c and is incident on the third optical element 531c, and transfers the image to a position suitable for a user with a wide IPD FIG. 20 is a schematic view for briefly explaining the configuration of the image transfer unit 501 according to a second embodiment of the present disclosure.

The image transfer unit 501 according to the second embodiment includes a light emitting unit 511 and a plurality of light reflecting members 521. The display unit 530 includes a plurality of optical elements 531 corresponding to the light reflecting member 521. The optical element 531 may refer to an area in which individual optical element cells are grouped. The optical element cells may be arranged in one direction and arranged in a lattice form.

The optical elements 531 may be arranged side by side in the horizontal direction (the direction connecting the pupils in both eyes of the user). In addition, three or more optical elements 531 may be disposed in the horizontal direction. Taking the display unit 530 corresponding to the right eye as an example, the display unit 530 includes three optical elements 531a, 531b, and 531c, among which the second optical element 531b positioned in the middle is provided at a position corresponding to the IPD of a normal range, and the first optical element 531a positioned at the inner side (left side) than the second optical element 531b is provided at a position corresponding to the IPD narrower than the normal range, and the third optical element 531c positioned at the outer side (right side) than the second optical element 531b is provided at a position corresponding to the IPD wider than the normal range.

In addition, the light reflecting member 521 corresponds to a first optical element 531a, corresponds to a first light reflecting member 521a and a second optical element 531b positioned thereon, and corresponds to a second light reflecting member 521b and a third optical element 531c positioned thereon, and includes a third light reflecting member 521c positioned thereon.

In addition, the first to third light reflecting members 521a, 521b, and 521c may be disposed at different heights with respect to the light emitting unit 511. Therefore, the first light reflecting member 521a does not interfere with the path of the light irradiated from the light emitting unit 511 to the second light reflecting member 521b, and the first and second light reflecting members 521a and 521b does not interfere with the path of the light irradiated to the third light reflecting member 521c.

Further, the light emitting unit 511 is provided to tilt the irradiation angle of the light signal to be irradiated. Therefore, even when the light reflecting member 521 does not operate variably, it is possible to selectively irradiate light to each light reflecting member 521.

Referring to FIG. 20(a), when the light emitting unit 511 irradiates an optical signal in a tilted upward direction, the optical signal is reflected by the first light reflecting member 521a that is positioned relatively at an upper portion and is incident to the first optical element. 531a, and transfers the image to a position suitable for a user with the narrow IPD.

Referring to FIG. 20(b), when the light emitting unit 511 irradiates an optical signal in a tilted state in the horizontal direction, the optical signal is reflected by the second light reflecting member 521b which is positioned relatively in the middle and is incident to the second reflecting member 531b, and transfers the image to a position suitable for a user with the average IPD.

Referring to FIG. 20(c), when the light emitting unit 511 irradiates an optical signal in a tilted downward direction, the optical signal is reflected by the third light reflecting member 521c which is positioned relatively at a lower portion and is incident to the third reflecting member 531c, and transfers the image to a position suitable for a user with the wide IPD.

FIG. 21 is a schematic diagram for briefly explaining the configuration of the image transfer unit 502 according to a third embodiment of the present disclosure.

The image transfer unit 502 according to the third exemplary embodiment includes a light emitting unit 510, a plurality of light reflecting members 522, and an intermediate reflecting member 512 for selectively reflecting the light image emitted from the light emitting unit 510 to each of the light reflecting member 522. In addition, the display unit 530 includes a plurality of optical elements 531 corresponding to the light reflecting member 522. The optical element 531 may refer to an area in which individual optical element cells are grouped. The optical element cells may be arranged in one direction and arranged in a lattice form.

The optical elements 531 may be arranged side by side in the horizontal direction (the direction connecting the pupils in both eyes of the user). In addition, three or more optical elements 531 may be disposed in the horizontal direction. Taking the display unit 530 corresponding to the right eye as an example, the display unit 530 includes three optical elements 531a, 531b, and 531c, among which the second optical element 531b positioned in the middle is provided at a position corresponding to the IPD of a normal range, and the first optical element 531a positioned at the inner side (left side) than the second optical element 531b is provided at a position corresponding to the IPD narrower than the normal range, and the third optical element 531c positioned at the outer side (right side) than the second optical element 531b is provided at a position corresponding to the IPD wider than the normal range.

In addition, the light reflecting member 522 corresponds to a first optical element 531a, corresponds to a first light reflecting member 522a and a second optical element 531b positioned thereon, and corresponds to a second light reflecting member 522b and a third optical element 531c positioned thereon, and includes a third light reflecting member 522c positioned thereon.

In addition, the first to third light reflecting members 522a, 522b, and 522c may be disposed at different heights with respect to the light emitting unit 511. Therefore, the first light reflecting member 522a does not interfere with the path of the light irradiated from the intermediate reflecting member 512 to the second light reflecting member 522b, and the first and second light reflecting members 522a and 522b does not interfere with the path of the light irradiated to the third light reflecting member 522c.

Further, the intermediate reflecting member 512 is provided to tilt the irradiation angle of the light signal to be irradiated. Therefore, even when the intermediate reflecting member 512 does not operate variably, it is possible to selectively irradiate light to each light reflecting member 522.

Referring to FIG. 21(a), when the intermediate reflecting member 512 reflects an optical signal of the light emitting unit 510 in a tilted upward direction, the optical signal is reflected by the first light reflecting member 522a that is positioned relatively at a front region and is incident to the first optical element. 531a, and transfers the image to a position suitable for a user with the narrow IPD.

Referring to FIG. 21(b), when the intermediate reflecting member 512 irradiates an optical signal of the light emitting unit 510 in a tilted state in the horizontal direction, the optical signal is reflected by the second light reflecting member 522b which is positioned relatively in the middle and is incident to the second reflecting member 531b, and transfers the image to a position suitable for a user with the average IPD.

Referring to FIG. 21(c), when the intermediate reflecting member 512 irradiates an optical signal of the light emitting unit 510 in a tilted downward direction, the optical signal is reflected by the third light reflecting member 522c which is positioned relatively at a rear region and is incident to the third reflecting member 531c, and transfers the image to a position suitable for a user with the wide IPD.

FIG. 22 is a schematic diagram for briefly explaining a configuration of an image transfer unit 503 according to a fourth embodiment of the present disclosure.

The image transfer unit 503 according to the fourth embodiment includes a movable light emitting unit 513. In addition, the display unit 530 includes a plurality of optical elements 531 corresponding to the movement path of the light emitting unit 513. The optical element 531 may refer to an area in which individual optical element cells are grouped. The optical element cells may be arranged in one direction and arranged in a lattice form.

The optical elements 531 according to the fourth embodiment may be arranged side by side in the horizontal direction (the direction connecting the pupils in both eyes of the user). In addition, three or more optical elements 531 may be disposed in the horizontal direction. Taking the display unit 530 corresponding to the right eye as an example, the display unit 530 includes three optical elements 531a, 531b, and 531c, among which the second optical element 531b positioned in the middle is provided at a position corresponding to the IPD of a normal range, and the first optical element 531a positioned at the inner side (left side) than the second optical element 531b is provided at a position corresponding to the IPD narrower than the normal range, and the third optical element 531c positioned at the outer side (right side) than the second optical element 531b is provided at a position corresponding to the IPD wider than the normal range.

The light emitting unit 513 may be provided at one side of the optical element 531 and may be provided to move in a direction parallel to the direction in which the first to third optical elements 531a, 531b, and 531c are disposed. The light emitting unit 513 may irradiate light at a position corresponding to the first to third optical elements 531a, 531b, and 531c.

The light emitting unit 513 may move along the guide 513a extending in one direction. The guide 513a may include a stopper (not shown) that may fix the light emitting unit 513 at positions corresponding to the first to third optical elements 531a, 531b, and 531c. For example, a stopper (not shown) may protrude from the guide 513a to fix the light emitting unit 513, and the protrusion may be released to allow movement of the light emitting unit 513.

Referring to FIG. 22(a), the light emitting unit 513 may irradiate an optical image to the first optical element 531a in a state positioned corresponding to an upper portion of the first optical element 531a, and the first optical element 531a transfers the image to a position suitable for a user with the narrow IPD.

Referring to FIG. 22(b), the light emitting unit 513 may irradiate an optical image to the second optical device 531b while moving in one direction and in a state positioned corresponding to the upper portion of the second optical device 531b and the second optical element 531b transfers the image to a position suitable for a user with the average IPD.

Referring to FIG. 22(c), the light emitting unit 513 may irradiate an optical image to the third optical element 531c while moving further in one direction and in a state positioned corresponding to the upper portion of the third optical element 531c and the third optical element 531c transfers the image to a position suitable for a user with the wide IPD.

FIG. 23 is a schematic view for briefly explaining a configuration of an image transfer unit 504 according to a fifth embodiment of the present disclosure.

The image transfer unit 504 according to the fifth embodiment includes a light emitting unit 510 and a movable light reflecting member 523. In addition, the display unit 530 includes a plurality of optical elements 531 corresponding to the movement path of the light reflecting member 523. Here, the optical element 531 may refer to an area in which individual optical element cells are grouped. The optical element cells may be arranged in one direction and arranged in a lattice form.

The optical elements 531 may be arranged side by side in the horizontal direction (the direction connecting the pupils in both eyes of the user). In addition, three or more optical elements 531 may be disposed in the horizontal direction. Taking the display unit 530 corresponding to the right eye as an example, the display unit 530 includes three optical elements 531a, 531b, and 531c, among which the second optical element 531b positioned in the middle is provided at a position corresponding to the IPD of a normal range, and the first optical element 531a positioned at the inner side (left side) than the second optical element 531b is provided at a position corresponding to the IPD narrower than the normal range, and the third optical element 531c positioned at the outer side (right side) than the second optical element 531b is provided at a position corresponding to the IPD wider than the normal range.

The light reflecting member 523 may be provided on one side of the optical element 531 and may move in a direction parallel to the direction in which the first to third optical elements 531a, 531b, and 531c are disposed. In addition, the light reflection member 523 may reflect light emitted from the emission unit 510 in a region corresponding to a region where the first to third optical elements 531a, 531b, and 531c are positioned.

In addition, the light reflecting member 523 may move along the guide 523a extending in one direction. The guide 523a may include a stopper (not shown) for fixing the light reflection member 523 at positions corresponding to the first to third optical elements 531a, 531b, and 531c. For example, a stopper (not shown) may protrude from the guide 523a to fix the light reflecting member 523, and the protrusion may be released to allow movement of the light reflecting member 523.

Referring to FIG. 23(a), the light reflecting member 523 may reflect an optical image to the first optical element 531a in a state where the light reflecting member 523 is positioned above the first optical element 531a. Element 531a delivers the image to a location suitable for users with narrow IPDs.

Referring to FIG. 23(b), the light reflecting member 523 may reflect an optical image to the second optical device 531b while moving in one direction and in a state positioned corresponding to the upper portion of the second optical device 531b and the second optical element 531b transfers the image to a position suitable for a user with the average IPD.

Referring to FIG. 23(c), the light reflecting member 523 may reflect an optical image to the third optical element 531c while moving further in one direction and in a state positioned corresponding to the upper portion of the third optical element 531c and the third optical element 531c transfers the image to a position suitable for a user with the wide IPD.

In the image transmission units 500, 501, 502, 503, and 504 described with reference to FIGS. 19 to 23, the lengths of the paths (optical paths) through which the optical signals travel from the light emitting units 510, 511, and 513 to the images through each of the optical elements 531a, 531b, and 531c may be different.

In general, when a difference occurs in the optical path, the distance or depth of image formation on the lens (hereinafter, expressed as a focal length) may be changed, and the size of the screen (FOV) on which the image is formed on the lens may be also changed.

For this reason, even when the optical elements 531a, 531b, and 531c to which light is transferred are changed in response to the IPDs being changed, the image transfer units 500, 501, 502, 503, and 504 controls the optical paths to be matched or within the acceptable focal length range, and it is required to narrow a difference in the optical path.

In addition, it is also possible to solve the problem of changing the focal length due to the difference in the optical path length by lengthening the optical path. Comparing the case where there is an optical path difference by 'a' when the optical path is long and the optical path difference by 'a' when the optical path is short, the former case has a low degree than the latter case in that the distance that an image is formed and the size of a screen are changed by the difference in focal length.

As such, by lengthening the optical path itself, some of the focal length difference problem caused by the difference in the optical path length can be solved, and further the optical path is lengthened, resulting in high light quantity and low power.

In order to compensate for the focal length due to the optical path length difference, a material having a high refractive power may be interposed on a path through which light irradiated from the light emitting units 510, 511, 513 is incident to the optical element 531.

Refractive power (optical power, dioptric power, refractive power, focusing power, convergence power) is the degree to which a lens, mirror, or other optical system collects or separates light. The refractive power is equal to the inverse of the focal length of a device (P=1/f; where P is the refractive power, f is the focal length), that is, the higher the refractive power is, the shorter the focal length is.

FIG. 24 is a schematic diagram for briefly explaining a configuration of an image transfer unit 505 according to a sixth embodiment of the present disclosure.

The image transfer unit 505 according to the sixth embodiment, compared with the image transfer unit 500 shown in FIG. 19, on a path through which the light image irradiated from the light emitting unit 510 is transferred to the light reflecting member 520, a refractive power member 514 may be interposed thereon.

The refractive power member 514 may vary the refractive power. Since the structure of varying the refractive power is introduced in detail in the known literature, the detailed description thereof will be omitted.

Referring to FIGS. 24(a) to 24(c), the light path is the shortest when the first light reflecting member 520a is on and the light path the longest when the third light reflecting member 520c is on. Correspondingly, the refractive power member 514 has the largest variable refractive power when the first light reflecting member 520a is on and the smallest variable power when the third light reflecting member 520c is on. As a result, the refractive power member 514 varies the refractive power, so that even if the optical signal irradiated from the light emitting unit 510 is reflected by any of the first to third light reflecting members 520a, 520b, and 520c The focal length of the optical image reflected by the three optical elements 531a, 531b, and 531c may be constant or within an acceptable range.

FIG. 25 is a schematic diagram for briefly explaining a configuration of an image transfer unit 506 according to a seventh embodiment of the present disclosure.

The image transfer unit 506 according to the seventh embodiment is compared with the image transfer unit 500 illustrated in FIG. 19, in which on the path that a light image reflected by the light reflecting member 520 is transferred to the optical element 531, the refractive power member 515 may be interposed therebetween.

The refractive power member 515 is formed of a first refractive power member 515a disposed on an optical path transferred from the first light reflection member 521a to the first optical element 531a and a second light reflection member 521b. The second refractive power member 515b disposed on the optical path transferred to the second optical element 531b, and the second optical power member 521c disposed on the optical path transferred from the third light reflection member 521c to the third optical element 531c. Three refractive power members 515c.

In addition, the first to third refractive power members 515a, 515b, and 515c have different refractive powers.

Referring to FIGS. 25(a) to 25(c), when the light image is reflected by the first light reflecting member 520a, the light path is shortest and the light image is reflected by the third light reflecting member 520c. In this case the optical path is the longest. Correspondingly, the refractive power of the first refractive power member 515a is the largest, and the refractive power of the third refractive power member 515c is the smallest. As a result, even if the light signal emitted from the light emitting unit 510 is reflected by any of the first to third light reflecting members 520a, 520b, and 520c, the focal length of the optical image reflected from the first and third optical elements 531a, 531b, and 531c may be constant or satisfy within an acceptable range.

FIG. 26 is a schematic diagram for briefly explaining the configuration of the image transfer unit 507 according to an eighth embodiment of the present disclosure.

The image transfer unit 507 according to the eighth embodiment, compared with the image transfer unit 500 illustrated in FIG. 19, may be provided such that the refractive power of the first to third light reflection members 524a, 524b, and 524c is different from each other.

For example, the light reflecting member 524 may include a concave reflecting mirror, and the refractive indices of the first to third light reflecting members 524a, 524b, and 524c may be different from each other to change the refractive power of the reflected light image.

Referring to FIGS. 26(a) to 26(c), the light path when the light image is reflected by the first light reflecting member 524a is the shortest and the light path when the light image is reflected by the third light reflecting member 524c is the longest. In this case the optical path is the longest. Correspondingly, the refractive power of the first light reflecting member 524a is the largest, and the refractive power of the third light reflecting member 524c is the smallest. As a result, even if the light signal emitted from the light emitting unit 510 is reflected by any of the first to third light reflecting members 524a, 524b, and 524c, the focal length of the optical image reflected from the first and third optical elements 531a, 531b, and 531c may be constant or satisfy within an acceptable range.

Particular embodiments or other embodiments of the present disclosure described above are not mutually exclusive to each other or distinguishable from each other. Individual structures or functions of particular embodiments or other embodiments of the present disclosure described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

NUMBER IN DRAWINGS

| | |
|---|---|
| 30: VR electronic device, | 31: head unit, |
| 32: display unit, | 32a: cover unit, |
| 32b: display unit, | 33: facial pad |
| 40: controller, | 50: position tracking device, |
| 60: external device, | 100: frame, |
| 110: front frame, | 120: side frame, |
| 130: user input unit, | 140: sound emitting unit, |
| 200: controller, | 300: display unit, |
| 500: image transfer unit, | 510, 511, 513: light emitting unit |
| 512: intermediate reflecting member, | |
| 514, 515: refractive power member, | |
| 520, 521, 522, 523, 524: light reflecting member, | |
| 530: display unit, | 531: optical element. |

What is claimed is:

1. An electronic device comprising:
    a display provided at a position corresponding to a left eye and a right eye of a user, the display including a lens and an optical element provided in the lens to transfer an output image toward an eye of the user; and
    a light emitter configured to transfer the image from the processor as an optical signal; and
    a light reflecting unit comprising a plurality of light reflectors configured to reflect the optical signal of the light emitter to transfer the optical signal to the optical element,
    wherein the optical element comprises a left eye optical element and a right eye optical element,
    wherein the left eye optical element and the right eye optical element each comprises a plurality of pin-mirrors provided in a lateral direction connecting the left eye and the right eye of the user, and
    wherein the light reflecting unit is controllable to selectively transfer the optical signal to a subgroup of a plurality of subgroups of the plurality of pin-mirrors of the optical element differently based on a lateral pupil position of the user, wherein the subgroups are grouped along the lateral direction.

2. The electronic device of claim 1,
    wherein the lens comprises:
    a left eye lens provided at a position corresponding to the left eye of the user; and
    a right eye lens provided at a position corresponding to the right eye of the user,
    wherein the left eye optical element is provided in the left eye lens, and
    wherein the right eye optical element is provided in the right eye lens.

3. The electronic device of claim 2, further comprising:
    a front frame supporting the left eye lens and the right eye lens; and
    a side frame connected to the front frame and configured to be supported on a head of the user,
    wherein the light emitter is provided in the front frame between the left eye lens and the right eye lens.

4. The electronic device of claim 1, wherein the display further comprises a sensor for detecting the pupil position of the eyeball of the user, and
    wherein the processor receives a signal from the sensor and transfers two or more different commands based on the pupil position of the user to the light emitter.

5. The electronic device of claim 1, wherein the light emitter is configured to emit the optical signal to any one of a plurality of paths, and
    wherein the plurality of light reflectors are provided on the plurality of paths, respectively.

6. The electronic device of claim 5, wherein the light emitter is rotatably provided to change the path of the optical signal, and
    wherein the plurality of light reflectors are disposed on a same plane as the light emitter.

7. The electronic device of claim 1, further comprising an intermediate reflector configured to selectively reflect the optical signal from the light emitter to different reflection paths toward the plurality of light reflectors based on the pupil position of the user.

8. The electronic device of claim 7, wherein the intermediate reflector is rotatably provided to change the reflection path of the optical signal, and
    wherein the plurality of light reflectors are disposed on a same plane as the intermediate reflector.

9. The electronic device of claim 1, further comprising a refractive member disposed between the light emitter and the left eye optical element and the right eye optical element, and wherein the refractive member is configured to compensate for a difference in the image caused by a difference in distance between the light emitter and each respective pin mirror of the plurality of pin-mirrors.

10. The electronic device of claim 9, wherein the refractive member is disposed on an optical path between the light emitter and the plurality of light reflectors, and an optical power is variable so as to compensate for a difference in distance between the light emitter and each respective pin mirror of the plurality of pin-mirrors.

11. The electronic device of claim 9, wherein the plurality of light reflectors includes a first reflector and a second reflector, wherein each of the left eye optical element and the right eye optical element includes a plurality of first pin-mirrors and a plurality of second pin-mirrors, wherein the refractive member includes a first refractive member disposed on an optical path between the first reflector and the first pin-mirrors, and a second refractive member disposed on an optical path between the second reflector and the second pin-mirrors, and wherein the first refractive member and the second refractive member have different optical powers so as to compensate for a difference between a distance between the first pin-mirrors and the light emitter and a distance between the second pin-mirrors and the light emitter.

12. The electronic device of claim 1, wherein the plurality of light reflectors are provided to have a refractive index different from each other so as to compensate for a difference in the image caused by a difference in distance between the light emitter and each respective pin mirror of the plurality of pin-mirrors.

13. An electronic device comprising:

a display provided at a position corresponding to a left eye and a right eye of a user, the display including a lens and an optical element provided in the lens to transfer an output image toward an eyeball of the user;

a light emitter for transferring the image from the processor as an optical signal; and a light reflecting unit comprising a plurality of light reflectors configured to reflect the optical signal of the light emitter to transfer the optical signal to the optical element, wherein the each of the plurality of light reflectors are configured to be switchable between a transmissive state wherein the optical signal is not reflected and a reflective state wherein the optical signal is reflected toward the optical element, wherein the optical element comprises a left eye optical element and a right eye optical element each comprising a plurality of pin-mirrors, and wherein the optical signal is transferred to the light reflecting unit differently based on a pupil position of the user.

14. The electronic device of claim 13, wherein the plurality of light reflectors are capable of being switched between the transmissive state and the reflective state according to a command of the processor.

15. The electronic device of claim 13, wherein the plurality of light reflectors are provided on a path of the optical signal provided from the light emitter, and comprises a first light reflector disposed closer to the light emitter and a second light reflector disposed farther from the light emitter, wherein, when the first light reflector is provided in the reflective state, the optical signal provided from the light emitter is transferred to pin-mirrors corresponding to the first light reflector, and wherein, when the first light reflector is provided in the transmissive state and the second light reflector is provided in the reflective state, the optical signal provided from the light emitter is transferred to pin-mirrors corresponding to the second light reflector.

16. The electronic device of claim 13, wherein the plurality of light reflectors are provided on a same path of the optical signal provided from the light emitter.

17. An electronic device comprising:

a display provided at a position corresponding to a left eye and a right eye of a user, the display including a lens and an optical element provided in the lens to transfer an output image toward an eye of the user; and a light emitter configured to transfer the image from the processor as an optical signal; and a light reflector configured to reflect the optical signal from the light emitter to transfer the optical signal to a plurality of pin-mirrors of the optical element, and wherein the light reflector is provided to be movable along a direction parallel to an arrangement of the plurality of pin-mirrors to transfer the optical signal to the plurality of pin-mirrors differently based on a pupil position of the user.

* * * * *